(12) United States Patent
Gamache et al.

(10) Patent No.: US 11,788,994 B2
(45) Date of Patent: Oct. 17, 2023

(54) PULSING PURGE DIAPHRAGM VALVE AND RELATED METHOD

(71) Applicant: Mécanique Analytique Inc., Thetford Mines (CA)

(72) Inventors: Yves Gamache, Thetford Mines (CA); André Lamontagne, Thetford Mines (CA); André Cliche, Thetford Mines (CA)

(73) Assignee: Mécanique Analytique Inc., Thetford Mines (CA)

( * ) Notice: Subject to any disclaimer, the term of this patent is extended or adjusted under 35 U.S.C. 154(b) by 0 days.

(21) Appl. No.: 17/785,984

(22) PCT Filed: Dec. 16, 2020

(86) PCT No.: PCT/CA2020/051732
§ 371 (c)(1),
(2) Date: Jun. 16, 2022

(87) PCT Pub. No.: WO2021/119816
PCT Pub. Date: Jun. 24, 2021

(65) Prior Publication Data
US 2023/0028446 A1    Jan. 26, 2023

Related U.S. Application Data

(60) Provisional application No. 62/949,733, filed on Dec. 18, 2019.

(51) Int. Cl.
*G01N 30/20* (2006.01)
*F16K 15/18* (2006.01)
(Continued)

(52) U.S. Cl.
CPC ........... *G01N 30/20* (2013.01); *F16K 11/022* (2013.01); *F16K 15/184* (2021.08); *F16K 11/20* (2013.01);
(Continued)

(58) Field of Classification Search
CPC .............. F16K 11/20; G01N 2030/205; Y10T 137/4259; Y10T 137/87249
See application file for complete search history.

(56) References Cited

U.S. PATENT DOCUMENTS 3,387,496 A * 6/1968 Broerman .............. G01N 30/20
251/62
7,931,043 B2    4/2011 Gamache et al.
(Continued)

FOREIGN PATENT DOCUMENTS

WO     2019227231 A1    12/2019
WO     2020160634 A1     8/2020
WO     2021119816 A1     6/2021

OTHER PUBLICATIONS

International Search Report issued for International Application No. PCT/CA2020/051732, entitled "Pulsing Purge Diaphragm Valve and Related Method," dated Feb. 16, 2021.
(Continued)

*Primary Examiner* — Robert K Arundale
(74) *Attorney, Agent, or Firm* — Hamilton, Brook, Smith & Reynolds, P.C.

(57) ABSTRACT

A diaphragm valve for gas analysis applications is provided. The valve includes a valve cap provided with a plurality of process conduits extending therethrough, a valve body engageable with the valve cap and having a body interface provided with a recess, a diaphragm positioned between the valve cap and valve body and having a process groove for circulating fluid therein, the process groove engaging the recess, a plunger assembly provided within the valve body,
(Continued)

the plunger assembly comprising a plurality of plungers movable between a closed position wherein the plunger engages the diaphragm, and an open position wherein the plunger is spaced from the diaphragm, and an actuating assembly comprising a gas inlet to allow the injection of actuating gas therein, the actuating assembly comprising a purging system for purging a region located between the diaphragm and the body interface, whereby the actuating gas is used for purging the region.

20 Claims, 26 Drawing Sheets

(51) Int. Cl.
*F16K 11/02* (2006.01)
*F16K 11/20* (2006.01)

(52) U.S. Cl.
CPC ... *G01N 2030/205* (2013.01); *Y10T 137/4259* (2015.04); *Y10T 137/87249* (2015.04)

(56) References Cited

U.S. PATENT DOCUMENTS

| | | | |
|---|---|---|---|
| 8,794,594 B2 | 8/2014 | Gamache et al. | |
| 8,851,452 B2* | 10/2014 | Gamache | G01N 30/20 |
| | | | 251/77 |
| 8,864,102 B2 | 10/2014 | Gamache | |
| 9,377,444 B2 | 6/2016 | Gamache | |
| 9,632,065 B2 | 4/2017 | Gamache | |
| 2009/0152481 A1* | 6/2009 | Gamache | F16K 11/20 |
| | | | 251/12 |
| 2015/0083259 A1* | 3/2015 | Gamache | F16K 11/20 |
| | | | 137/863 |

OTHER PUBLICATIONS

Written Opinion of the International Searching Authority issued for International Application No. PCT/CA2020/051732, entitled "Pulsing Purge Diaphragm Valve and Related Method," dated Feb. 16, 2021.

* cited by examiner

ACTUATION PRESSURE OF THE VALVE

PRESSURE WITHIN THE PURGE REGION

PULSING PURGE DIAPHRAGM VALVE AND RELATED METHOD

This application is the U.S. National Stage of International Application No. PCT/CA2020/051732, filed Dec. 16, 2020, which designates the U.S., published in English, and claims the benefit of U.S. Provisional Application No. 62/949,733, filed Dec. 18, 2019. The entire teachings of the above applications are incorporated herein by reference.

TECHNICAL FIELD

The technical field generally concerns systems and methods related to valves, and relates more particularly to a purging system for diaphragm-sealed valves, such as those used in gas analysis and/or gas chromatography applications.

BACKGROUND

In diaphragm valves, communication between ports is blocked or allowed by pushing or retracting plungers on/from the diaphragm, which is typically made of a soft/deformable material. Diaphragm valves may be provided with a purging system configured to inject a purge gas into selected regions of the valve in order to purge impurities therefrom. A region that is particularly important to purge is the region below the diaphragm. Given that the diaphragm has a certain degree of porosity, gas molecules/atoms may leak there through, and contaminate the valve.

Existing purging system typically require purge inlets, outlets, tubing, fittings and/or conduits to reach the desired regions and effectively purge the valve. This additional hardware for operating the valve can increase the manpower cost for producing the valves, the cabinet space required for the various components and ultimately increases the price of the valve. Furthermore, the operating costs of the valve can also increase since a constant/continuous flow of purge gas is injected in the valve to ensure a clean environment within the valve.

In light of the above, there is a need for an improved valve with a simpler and effective purging system. There is also a need for a valve that would be easier to manufacture, and that would allow overcoming drawbacks related to the difficulty of operating a continuous purging system.

SUMMARY

According to a first aspect, a diaphragm valve for gas analysis applications is provided. The valve includes a valve cap provided with a plurality of process conduits extending therethrough, the valve cap having a cap interface, and each one of the process conduits comprising a process port opening on the cap interface. The valve also includes a valve body engageable with the valve cap and having a body interface adapted to face the cap interface and being provided with a recess, the valve body comprising a plurality of plunger passages extending therethrough, whereby the plunger passages open on the recess. A diaphragm is positioned between the valve cap and valve body and has a process groove for allowing fluid to circulate therein, the process groove being shaped and sized to engage with the recess of the valve body. The valve further includes a plunger assembly provided within the valve body, the plunger assembly comprising a plurality of plungers slidably fitted within a corresponding one of the plunger passages, each plunger being movable between a closed position where the plunger engages the diaphragm and blocks fluid circulation along the process groove between two process ports, and an open position where the plunger is spaced from the diaphragm, thereby allowing fluid to circulate along the process groove. The valve also has an actuating assembly having a gas inlet extending through the valve body to allow injection of actuating gas for moving the plungers between the open and closed positions, the actuating assembly further including a purging system for purging a purge region located between the diaphragm and the body interface, wherein the actuating gas is used for purging the purge region.

According to a possible embodiment, the valve also includes a bottom cap connected to the valve body and defining therewith an internal chamber, wherein the plunger assembly includes an upper piston operatively engaging a first set of plungers, and a lower piston engaging a second set of plungers, the upper piston and the lower piston being provided within the internal chamber, whereby the internal chamber is in fluid communication with the purge region via the plunger passages.

According to a possible embodiment, the first set of plungers are normally-opened plungers, and the second set of plungers are normally-closed plungers.

According to a possible embodiment, the internal chamber includes a top region located between the upper piston and the plurality of plunger passages, a bottom region located between the lower piston and the bottom cap, and an intermediate region located between the upper and lower pistons, and wherein the gas inlet is positioned to allow actuation gas to be injected in the intermediate region for actuating at least one of the upper and lower pistons.

According to a possible embodiment, the purge system includes a controlled flow channel adapted to establish fluid communication between the intermediate region and the top region.

According to a possible embodiment, the controlled flow channel includes a first flow restrictor adapted to restrict fluid flow therethrough in order to build pressure in the intermediate region.

According to a possible embodiment, the first flow restrictor is a first check valve having a first cracking pressure and being configured to allow fluid flow therethrough when the pressure within the intermediate region is above the first cracking pressure.

According to a possible embodiment, the controlled flow channel further comprises a flow limiter having a passage in fluid communication with an outlet of the first check valve, the passage being shaped and sized to limit a flow rate of the actuating gas from the intermediate region to the top region.

According to a possible embodiment, the upper piston includes a recess, and wherein the flow limiter includes a removable insert adapted to engage the recess of the upper piston, the passage extending through the removable insert.

According to a possible embodiment, the passage is shaped and sized to define a flow rate between the intermediate region and the top region between about 0.5 cm$^3$/min and 2 cm$^3$/min.

According to a possible embodiment, the actuation assembly further includes a gas outlet positioned to establish fluid communication between the internal chamber and the surrounding environment.

According to a possible embodiment, the gas outlet includes an outlet flow restrictor adapted to at least partially prevent gas from exiting the internal chamber, thereby routing the actuating gas to the purge region via the plunger passages.

According to a possible embodiment, the gas outlet communicates with the top region and the outlet flow restrictor includes an outlet check valve having an outlet cracking pressure configured to allow fluid flow therethrough when the pressure within the top region is above the outlet cracking pressure.

According to a possible embodiment, the outlet cracking pressure is greater than an atmospheric pressure of a surrounding environment of the diaphragm valve.

According to a possible embodiment, the outlet check valve has a closing pressure at which the outlet valve closes, and the pressure within the purge region oscillates between the outlet cracking pressure and the closing pressure.

According to a possible embodiment, the plungers have an outer surface, and each plunger includes one or more grooves extending along respective outer surfaces between a top end and a bottom end thereof to facilitate fluid communication between the top region of the internal chamber and the purge region.

According to a possible embodiment, the grooves are helicoidal and/or vertically oriented.

According to a possible embodiment, the plungers include a plunger head adapted to engage the diaphragm, a plunger base adapted to be engaged by one of the upper and lower pistons, and a plunger body extending between the plunger head to the plunger base, wherein the plunger head, plunger base and plunger body of one or more plungers are independent from one another and are stacked within respective plunger passages.

According to a possible embodiment, the plunger head and plunger base are substantially rigid, and wherein the plunger body is made of a compressible material, an elastomeric material or a combination thereof.

According to a possible embodiment, the plunger body includes at least two adjacent portions extending between the plunger head and plunger base, and wherein each portion has a different compressibility.

According to a possible embodiment, the plunger body is offset from a central longitudinal axis of the plunger.

According to a possible embodiment, the plunger base of each plunger is entirely seated on the corresponding one of the upper and lower pistons.

According to a possible embodiment, the plunger base of each plunger is fixedly connected to the corresponding one of the upper and lower pistons.

According to a possible embodiment, the upper piston includes a central aperture, a plurality of upper recesses and a plurality of upper protrusions, and the first set of plungers is adapted to be seated on the upper protrusions.

According to a possible embodiment, the lower piston includes a piston head adapted to extend through the central aperture of the upper piston, the lower piston comprising a plurality of lower recesses and lower protrusions, the second set of plungers is adapted to be seated on the lower protrusions.

According to a possible embodiment, the central aperture and piston head are complementarily shaped.

According to a possible embodiment, the upper protrusions are shaped and configured to engage the lower recesses, and the lower protrusions are shaped and configured to engage the upper recesses.

According to a possible embodiment, the actuating assembly further includes an activation system configured to selectively apply a force on the lower piston to move the second set of plungers in the closed position.

According to a possible embodiment, the activation system includes an actuation screw adapted to apply the force on the lower piston, and the bottom cap comprises a storage mechanism operatively engaged with the actuation screw to indicate the position of the actuation screw.

According to a possible embodiment, the actuation screw includes notches distributed about an outer periphery of the head of the actuation screw, and the storage mechanism includes a set screw engageable with the notches of the actuation screw.

According to another aspect, a method of purging a region between a diaphragm and a valve body of a diaphragm valve is provided. The method includes the steps of injecting actuating gas into the diaphragm valve via a gas inlet, routing the actuating gas along a purging circuit to reach the purging region, pressurizing the purging region and releasing the actuation gas via a gas outlet to purge the purging region.

According to a possible embodiment, the gas inlet communicates with an internal chamber provided within the diaphragm valve, wherein the step of injecting actuating gas into the diaphragm valve includes pressurizing the internal chamber to open a first check valve and allow the actuating gas to flow from the internal chamber to the purge region.

According to a possible embodiment, the step of routing the actuating gas along the purging circuit includes obstructing the gas outlet to force the actuating gas to flow from the internal chamber to the purge region to allow pressurization of the purge region, before exiting the valve via the gas outlet.

According to a possible embodiment, the purging circuit is defined entirely within the diaphragm valve.

According to another aspect, there is provided a diaphragm valve for gas analysis applications. The valve includes a valve cap provided with a plurality of process conduits extending therethrough, the valve cap having a cap interface, and each one of the process conduits comprising a process port opening on the cap interface; a valve body engageable with the valve cap and having a body interface adapted to face the cap interface and being provided with a recess, the valve body comprising a plurality of plunger passages extending therethrough, whereby the plunger passages open on the recess; a diaphragm positioned between the valve cap and valve body and having a process groove for circulating fluid therein, the process groove being shaped and sized to engage with the recess of the valve body; a plunger assembly adapted to be installed within the valve body, the plunger assembly comprising a plurality of plungers slidably fitted within a corresponding one of the plunger passages, each plunger being adapted to selectively engage the diaphragm to control fluid circulation along the process groove; and an actuating assembly comprising an activation system configured to enable injection of the actuating gas within the valve body for actuating the plunger assembly and displacing the plungers, wherein the diaphragm and the body interface define a purge region therebetween, and wherein the actuating assembly comprises a purging system configured to route the actuating gas to the purge region for purging the purge region and remove impurities therefrom.

According to yet another aspect, there is provided a diaphragm valve for gas analysis applications. The valve includes a valve cap provided with a plurality of process conduits extending therethrough, the valve cap having a cap interface, and each one of the process conduits comprising a process port opening on the cap interface; a valve body engageable with the valve cap and having a body interface adapted to face the cap interface and being provided with a recess, the valve body comprising a plurality of plunger passages extending therethrough, whereby the plunger passages open on the recess; a diaphragm positioned between the valve cap and valve body and having a process groove for circulating fluid therein, the process groove being shaped and sized to engage with the recess of the valve body; a plunger assembly adapted to be installed within the valve body, the plunger assembly comprising a plurality of plungers slidably fitted within a corresponding one of the plunger passages, each plunger being adapted to selectively engage the diaphragm to control fluid circulation along the process groove; an actuating assembly comprising an activation system comprising an actuation screw operably connectable to the plunger assembly and being operable between an engaged position, where the diaphragm valve can be operated for gas analysis applications, and a disengaged position; and a storage mechanism comprising a set screw engageable with a first portion of the actuation screw for indicating that the actuation screw is in the engaged position, and a second portion of the actuation screw for indicating that the actuation screw is in the disengaged position.

Other features of advantages of the present invention will be better understood upon reading example implementations thereof, with reference to the appended drawings.

It should also be noted that the embodiments of the diaphragm valve described herein are intended to be exemplary only, and that the features of one embodiment should not be understood as being exclusive to that particular embodiment, and that combinations and variations of the components described herein are possible and may be used.

BRIEF DESCRIPTION OF THE DRAWINGS

FIG. 12 is a perspective view of a plurality of plungers seated on the pistons shown in FIG. 11a.

Figure 1:
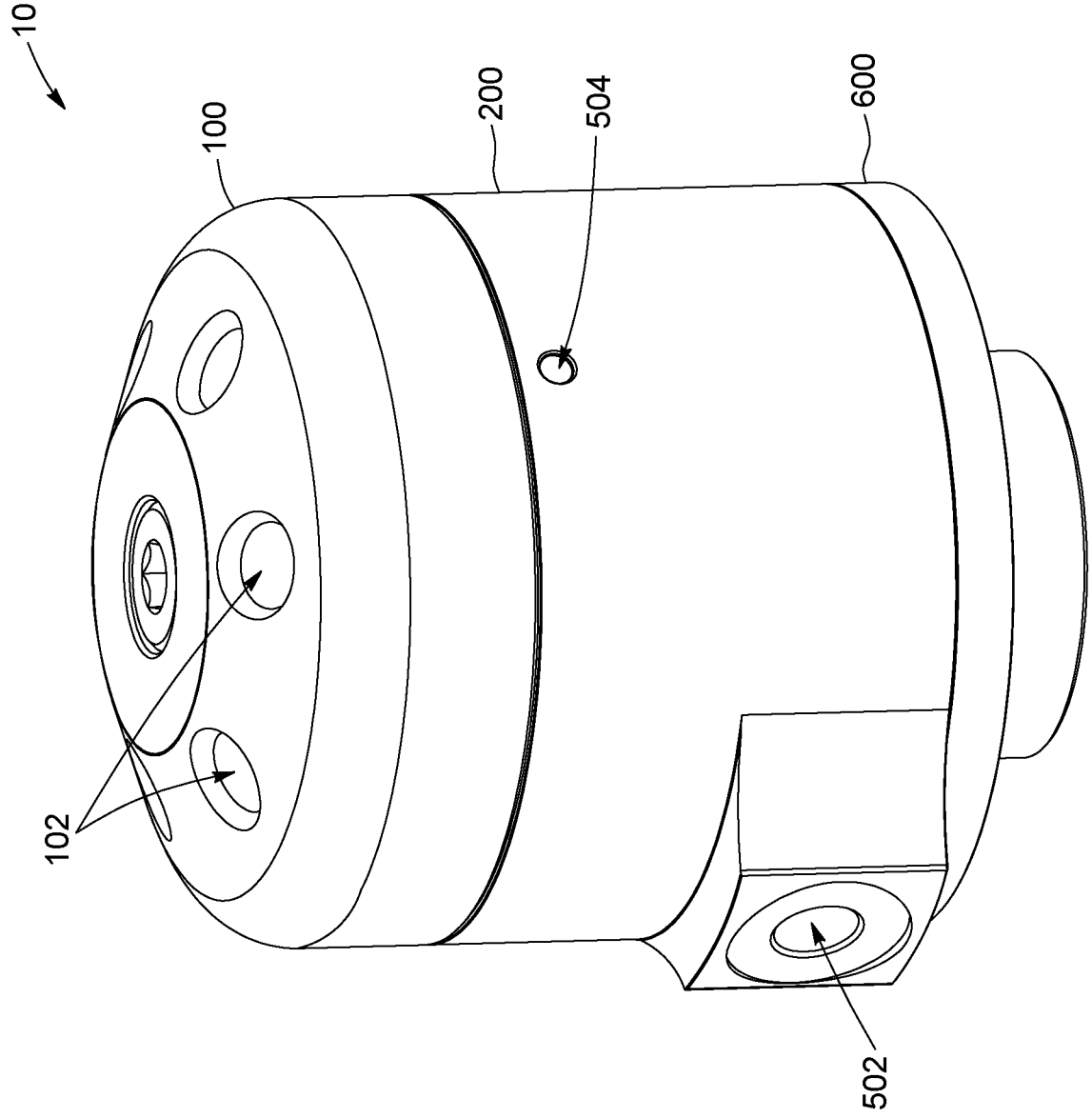
FIG. 1 is a top perspective view of a diaphragm-sealed valve, according to a possible embodiment.

While the invention will be described in conjunction with example embodiments it will be understood that it is not intended to limit the scope of the invention to such embodiments. On the contrary, it is intended to cover all alternatives, modifications and equivalents as defined in the present application.

DETAILED DESCRIPTION

The present invention relates to a valve, and more specifically to a diaphragm-sealed valve and its associated operating method. The diaphragm-sealed valve is herein referred to simply as a "valve". The valve includes many improvements, each of which can be implemented in the valve, independently from one another, or in combination. For example, the valve can include an improved purging system configured to effectively purge one or more regions located around the diaphragm of the valve. The purging system can be configured to create a cycle of recurring pulses to purge one or more regions of the valve. In possible embodiments, the valve can include plungers configured to facilitate purging the region around the diaphragm. In other embodiments, the valve can include a storage mechanism to facilitate storage of the valve once turned off. The invention will be better understood with the description of possible embodiments of the valve. While the different embodiments of the valve described below are of a diaphragm-sealed valve, it is understood that other types of valves are also possible.

Broadly referring to FIGS. 1 to 26, possible embodiments of a diaphragm-sealed valve 10 are shown. The valve 10 includes a valve cap 100, a valve body 200 engageable with the valve cap 100, a diaphragm 300 positioned between the valve cap 100 and the valve body 200, a plunger assembly 400 provided within the valve body 200, an actuating assembly 500 adapted to enable movement of the plunger assembly 400, and a bottom cap 600 connected to the valve body 200 opposite the valve cap 100. It is appreciated that other components can be provided in and/or with the valve 10, such as various fixings and fasteners (e.g., screws, nails, bolts, nuts, washers, springs, etc.) along with sealing elements (e.g., O-rings, etc.), among others. As will be described in relation with various embodiments, some of the components of the valve 10 are generally cylindrical in shape, such as the valve cap 100, valve body 200 and bottom cap 600, for example, and among others.

In the illustrated embodiments, the valve body 200 and bottom cap 600 form an internal chamber 210 for receiving actuating gas. As will be described below, the valve body 200 can be at least partially hollow, with the bottom cap 600 being configured to cooperate with the valve body 200 to close off the hollowed section, thereby defining the internal chamber 210. It will thus be understood that the valve 10 is pneumatically actuated and includes a gas inlet 502 communicating with the internal chamber 210 for providing actuating gas to the internal chamber 210 in order to displace the plunger assembly 400. In the embodiments illustrated, the valve is provided with "normally closed" (or raised) plungers and "normally open" (or lowered) plungers. The "normal" position of the plungers corresponding to when there is no actuating gas injected. The position of the plunger in their "normal" or "default" state is determined by the Belleville assembly 540 and wave springs 546. When actuating gas is injected in the valve's inlet 502, pistons 420, 430 are spaced apart, thereby moving the normally closed plunger toward an open (or lowered) position, and the normally open plungers toward a close (or raised) position. However, it is appreciated that other methods for actuating the plunger assembly 400 are possible.

Referring more specifically to FIGS. 1 to 5, the valve cap 100 has a plurality of process conduits 102 extending through a thickness of the valve cap 100, and respectively ending in a process port 104. The valve cap 100 further includes a cap interface 106 adapted to face the valve body 200 (and diaphragm 300) and on which the process ports 104 open. It is appreciated that, depending on the application of the valve 10, the valve cap 100 can be provided with any suitable number of process conduits 102 arranged in any suitable configuration. For example, in this embodiment, the valve cap 100 includes six process conduits 102 arranged in a circle such that the process ports 104 are correspondingly arranged in a circle on the cap interface 106. In other embodiments, the valve cap 100 can be provided with four, eight, ten, twelve or any other suitable number of process ports 102.

In this embodiment, the valve body 200 has a body interface 202 adapted to face the valve cap 100 such that when the valve 10 is assembled, the diaphragm 300 can be positioned between the valve cap 100 and valve body 200, such as between the cap interface 106 and the body interface 202. More specifically, the diaphragm 300 has a first surface, such as a top surface 302, adapted to contact the cap interface 106, and a second surface, such as a bottom surface 304, adapted to contact the body interface 202 when installed between the valve cap 100 and valve body 200.

Figure 6:
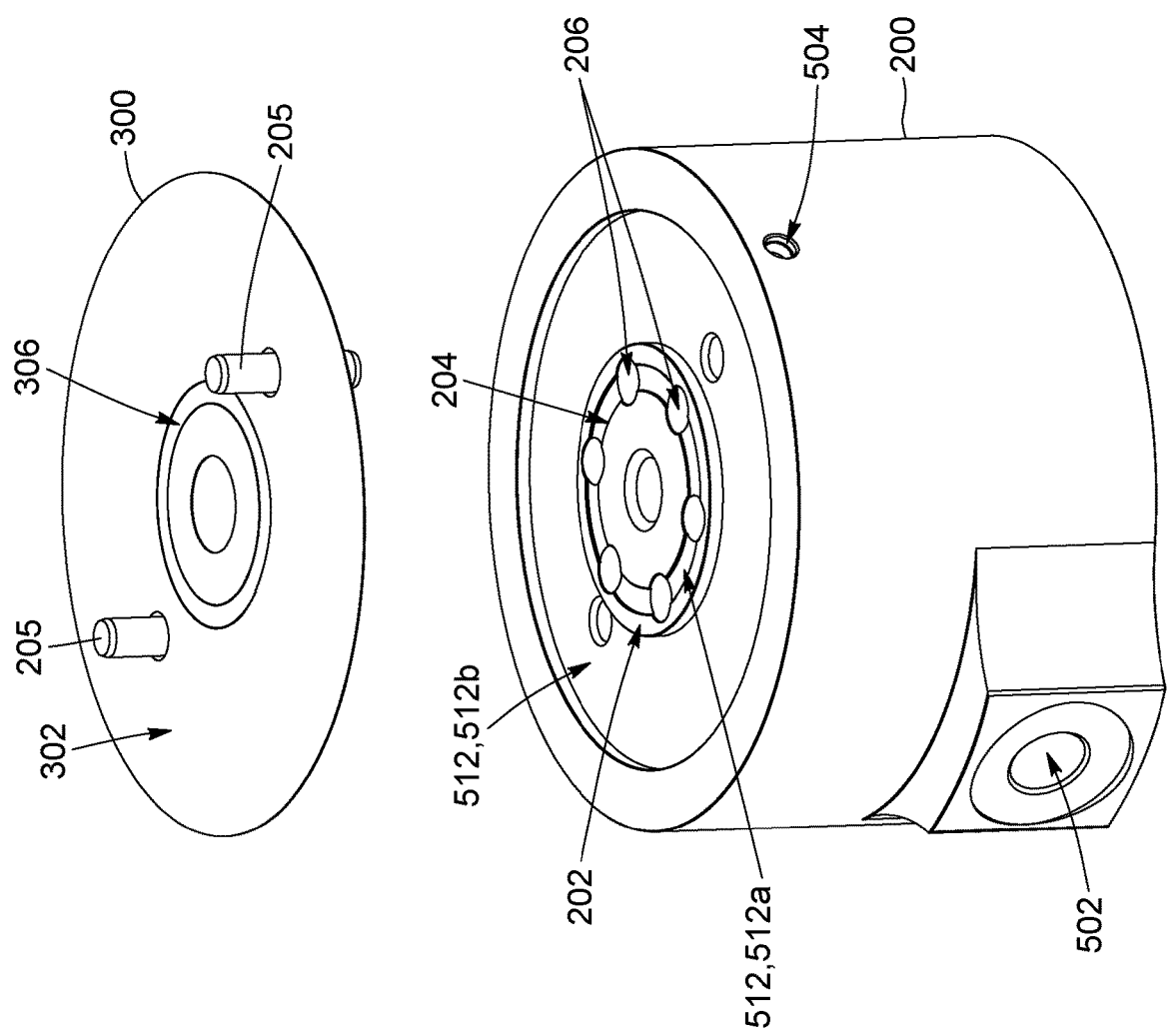
FIG. 6 is an enlarged view of the valve body and diaphragm shown in FIG. 3, showing a recess defined on a surface of the valve body and a process groove defined on the diaphragm, according to an embodiment.
Figure 7:
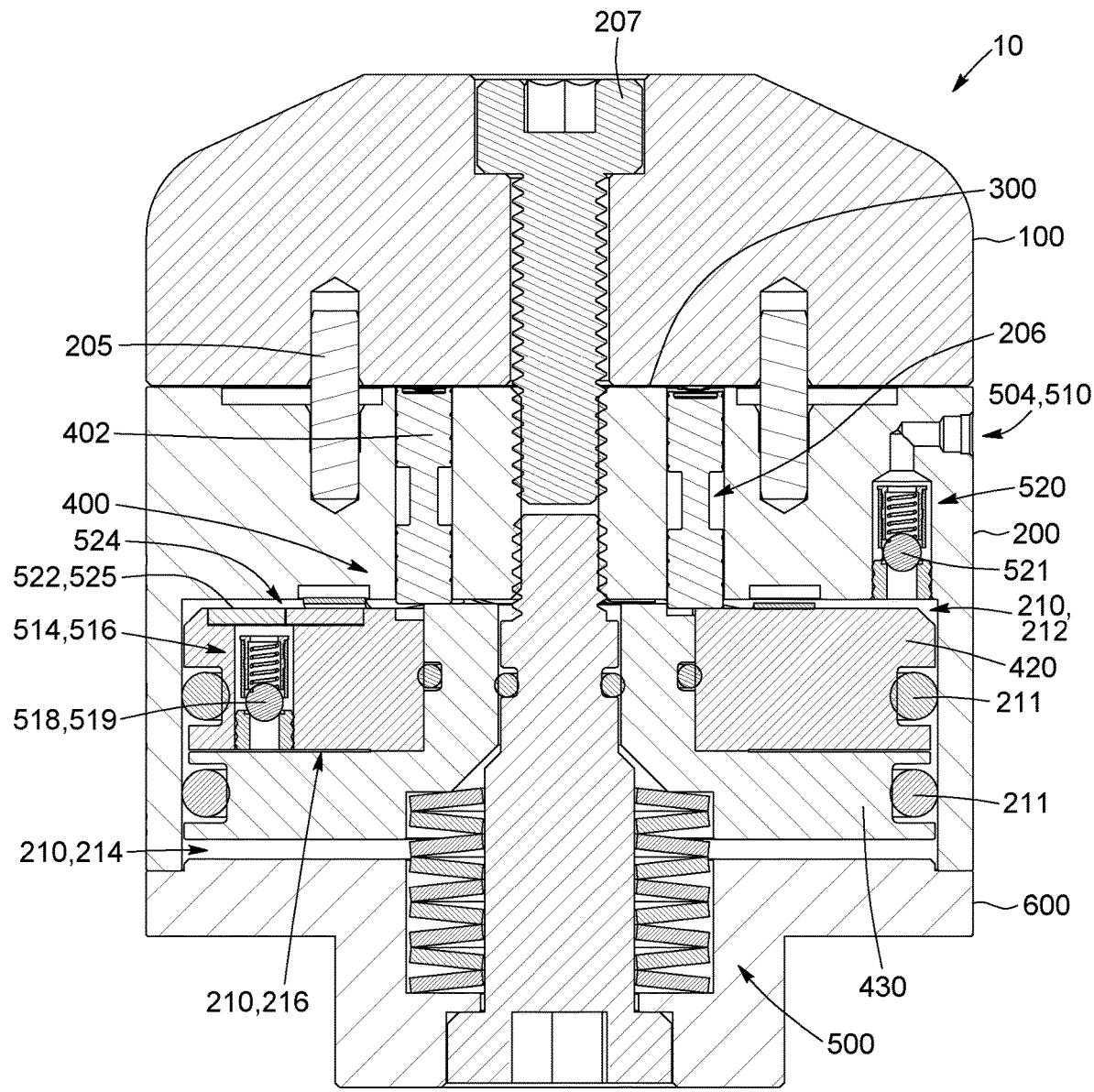
FIGS. 7 and 7A is a cross-sectional view of the valve of FIG. 1, showing plungers extending within plunger passages and a purging circuit within the valve, according to an embodiment.

As seen in FIGS. 6 and 7, and with continued reference to the previous figures, the valve body 200 includes a recess 204 defined on the surface of the body interface 202 such that the recess 204 faces the cap interface 106. The recess 204 illustratively has a circular shape and is substantially concentric with respect to the body interface 202 (e.g., the center of the body interface 202 corresponds to a central point of the recess 204). The process ports 104 of the valve cap 100 are preferably positioned to be in line with the recess 204 (i.e., open into the recess 204) when the valve 10 is assembled (i.e., when the valve cap 100 and valve body 200 are connected together). In some embodiments, the valve cap 100 and valve body 200 can be connected to each other using a central fastener 207 and a pair of dowel pins 205, although it is appreciated that other configurations and/or connection tools are possible and could be used. In some embodiments, the central fastener 207 can be provided with sealing elements, such as an O-ring proximate the head of the fastener, or a sealant provided along a threaded section, in order to at least prevent air infiltration via interstices between the valve cap 100 and the central fastener 207.

Still referring to FIGS. 6 and 7, the valve body 200 further includes a plurality of plunger passages 206 extending at least partially therethrough with a first end opening at respective locations along the recess 204, and a second end, opposite the first end, opening at respective and corresponding locations on the internal chamber 210. As will be described further below in relation with the plunger assembly 400, the plunger passages 206 are respectively shaped and sized to receive a plunger 402 and open on the recess 204 between two of the process ports 104.

In the present embodiment, the diaphragm 300 includes a process groove 306 shaped and sized to align with and engage the recess 204 of the valve body 200. Therefore, similar to the recess 204, the process groove 306 is adapted to align with the process ports 104 of the valve cap 100, and with the plunger passages 206 of the valve body 200. It should be understood that the process groove 306 is adapted to cooperate with the cap interface 106 to form a channel configured to allow fluids to circulate between at least two of the process ports 104. More specifically, the diaphragm 300 engages the cap interface 106 such that the surface of the cap interface 106 covers the process groove 306 and forms the channel. In this embodiment, fluid can be injected to the process groove 306 via one of the process conduits 102, which can then flow along the formed channel, for example, to reach the process port 104 of a second one of the process conduits 102.

As seen in FIG. 7, the plunger assembly 400 is illustratively adapted to be housed within the valve body 200, and more specifically within the internal chamber 210. The plunger assembly 400 includes plurality of plungers 402 slidably fitted within a corresponding one of the plunger passages 206, with the plungers 402 being movable between at least two positions. In this embodiment, each plunger 402 is movable between a closed position where the plunger 402 engages the process groove 306 of the diaphragm 300 to prevent fluid flow between at least two adjacent process ports 104, and an open position where the plunger 402 is spaced from the diaphragm 300, thereby allowing fluid to flow along the process groove 306. In order to reduce the risk of having a plunger 402 be stuck within the corresponding plunger passage 206, the plunger passages 206 preferably have a diameter slightly larger than the diameter of the widest component of the plungers 402. The specific construction and components of the plungers 402 will be described further below.

In some embodiments, as explained previously, the plungers 402 can be of two types, commonly referred to as "normally closed" and "normally open" plungers. As will be explained further below, each plunger 402 of a given type is actuated together along with the other plungers of that same type. In other words, the plungers 402 of a given type are either all in the closed position or all in the open position. In the present embodiment, the normally closed plungers are biased towards the closed position, whereas the normally opened plungers are biased towards the open position. It is appreciated that the normally opened plungers form a first set of plungers 402, while the normally closed plungers form a second set of plungers 402. In the illustrated embodiment, the plunger assembly 400 also includes a pair of pistons 420, 430 operatively engaging the plungers 402 for moving them up and down within their respective plunger passage 206. More specifically, the plunger assembly 400 includes a first piston, such as an upper piston 420, operatively engaging the first set of plungers (i.e., the normally opened plungers) and a second piston, such as a lower piston 430, operatively engaging the second set of plungers (i.e., the normally closed plungers).

Broadly described, and with reference to FIGS. 7 to 10, the pistons 420, 430 of the plunger assembly 400 are generally circular and parallel to the diaphragm 300. In the present embodiment, the upper piston 420 illustratively includes a central aperture 424, and the lower piston 430 includes a piston head 434 shaped and sized to extend through the central aperture 424 of the upper piston 420. It is appreciated that the central aperture 424 and piston head 434 can be complementarily shaped to allow movement of the pistons relative to one another while preventing the pistons from contacting one another and/or impeding their movement. In such an embodiment, the upper and lower piston can be manufactured using 3D printing technologies, to allow their assembly.

Figure 9:
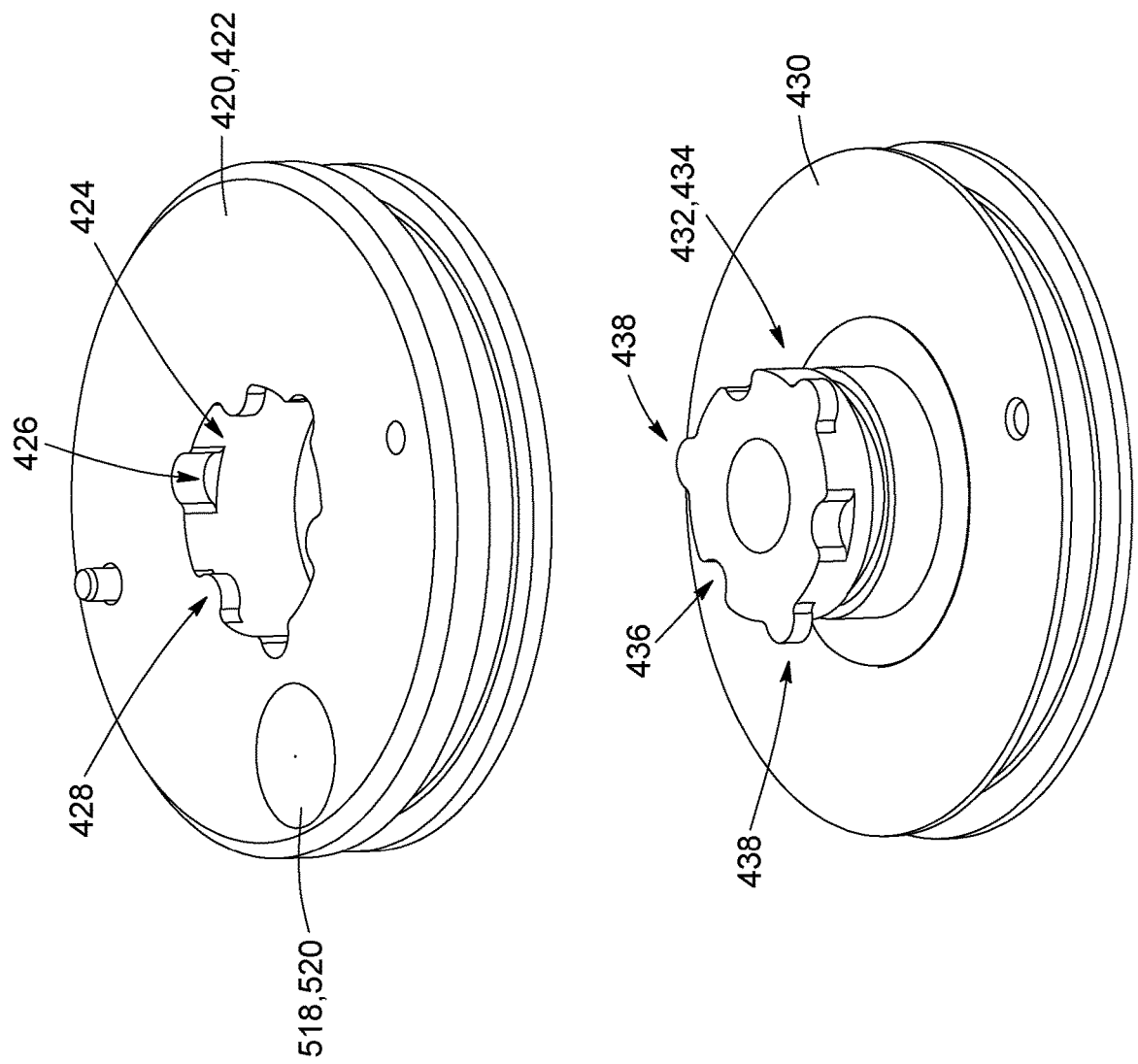
FIG. 9 is an exploded view of a portion of the plunger assembly shown in FIG. 8, showing an upper piston and a lower piston being at least partially complementarily shaped, according to an embodiment.
Figure 11A:
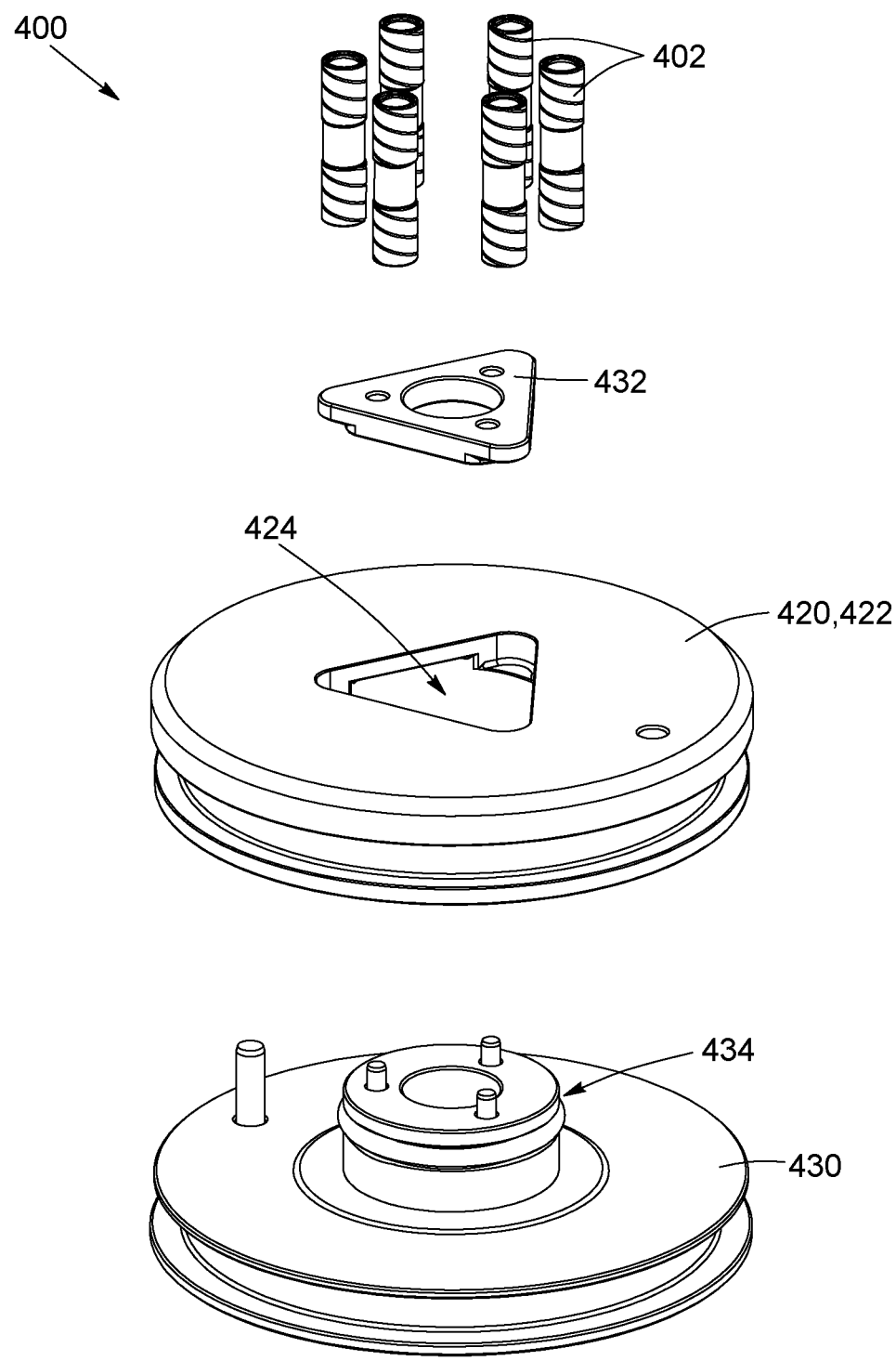
FIG. 11a is an exploded top perspective view of an alternative embodiment of the plunger assembly, showing a triangular push plate connectable to the lower piston, according to an embodiment.
Figure 11B:
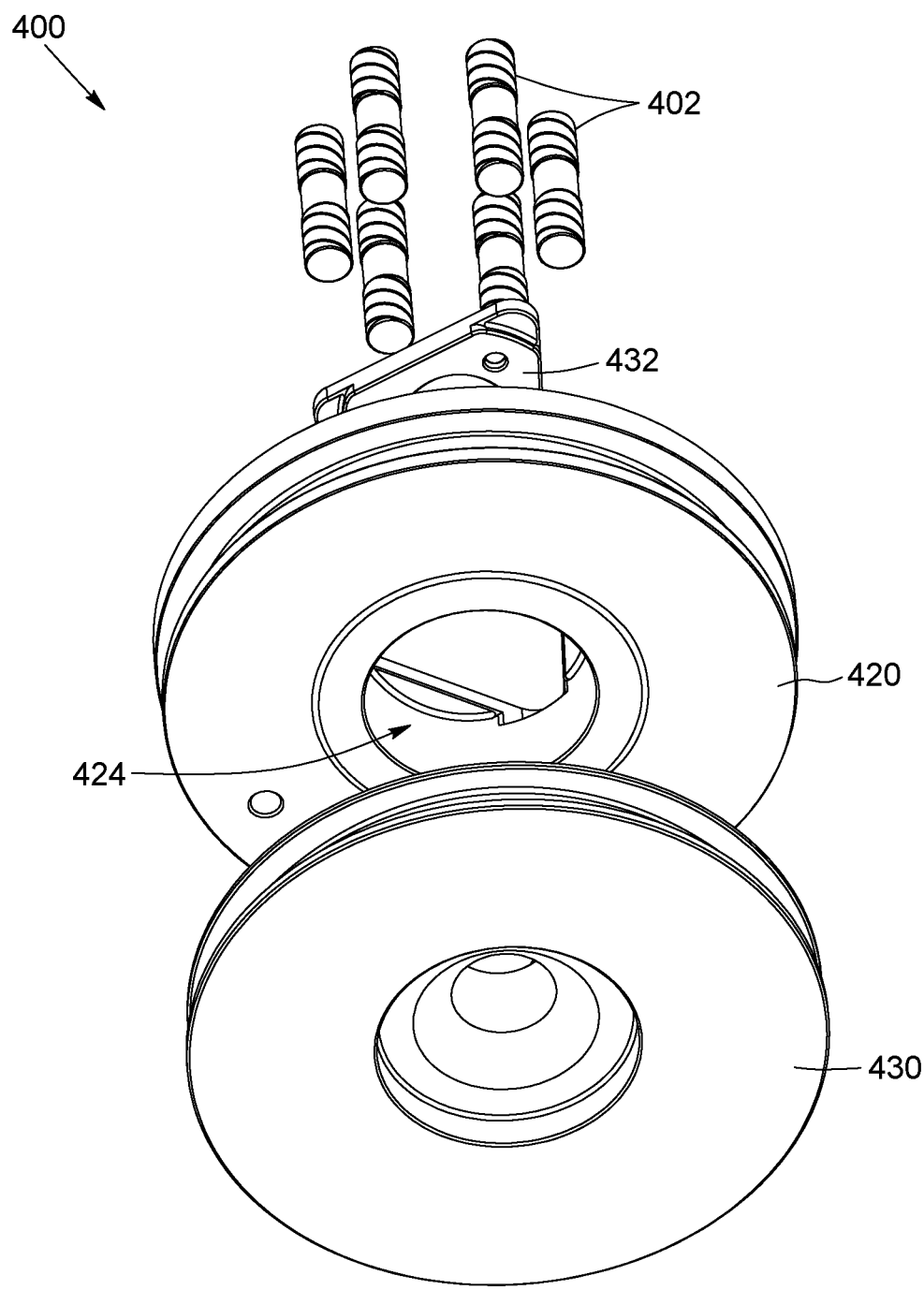
FIG. 11b is an exploded bottom perspective view of the alternative embodiment of the plunger assembly shown in FIG. 11a, showing the upper piston having a circular central aperture for receiving the piston head of the lower piston, according to an embodiment.
Figure 13:
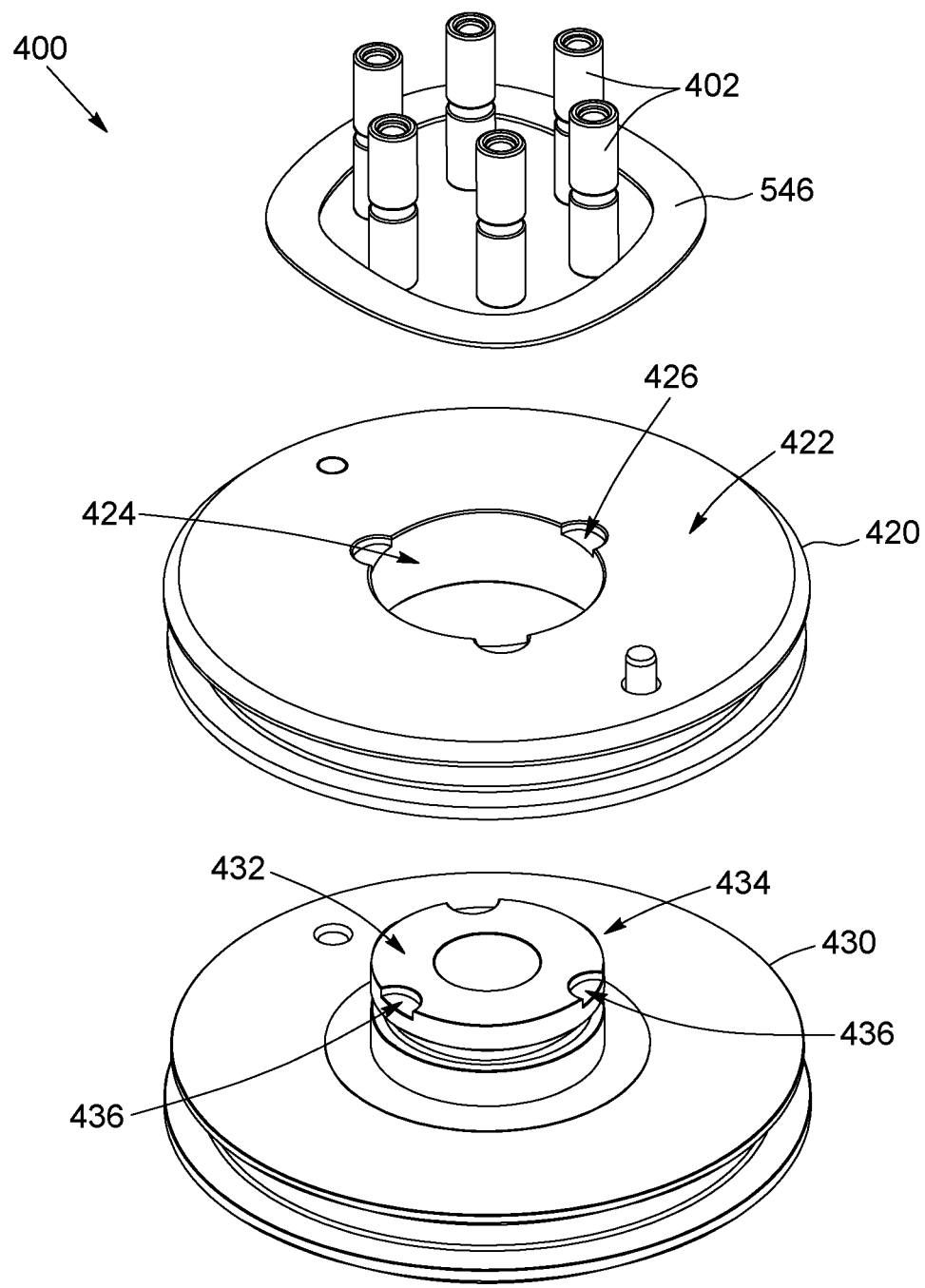
FIG. 13 is an exploded view of an alternative embodiment of the plunger assembly, showing a circular piston head engageable within a circular central aperture, according to an embodiment.

Moreover, each one of the pistons can include respective push plates 422, 432 on which the plungers 402 can rest, whereby each piston 420, 430 pushes and/or pulls their respective push plate 422, 432 upon operation of the actuating assembly 500. In this embodiment, the upper push plate 422 is integrally formed as part of the upper piston 420, although it is appreciated that other configurations are possible. In some embodiments, the lower push plate 432 is also integrally formed as part of the lower piston 430, while in other embodiments, the lower push plate 432 is a separate component, as seen in FIG. 11 for example. The lower push plate 432 can alternatively be integrally formed as part of the lower piston 430 and have a generally circular shape, as illustrated in FIGS. 9 and 13, for example.

Figure 8:
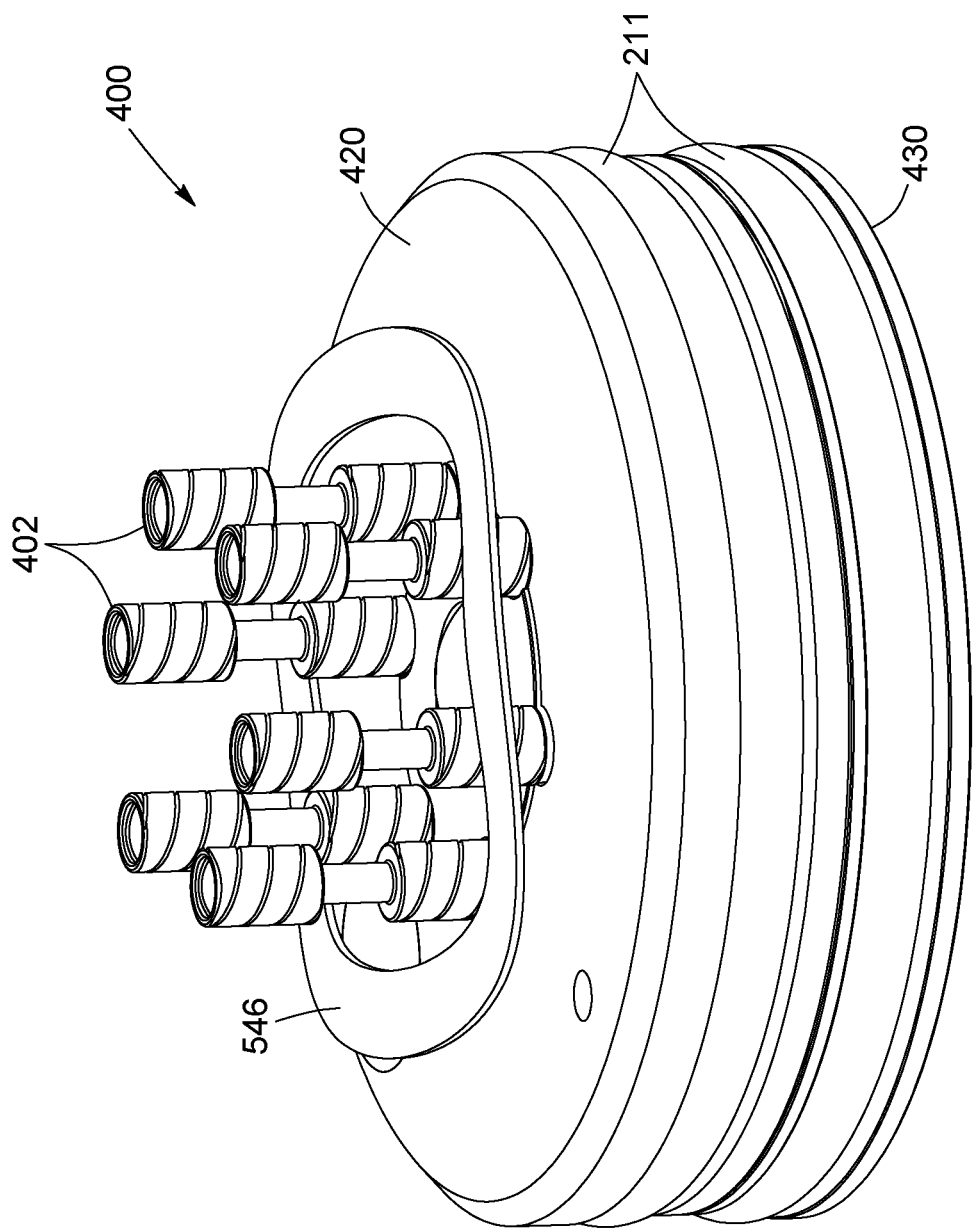
FIG. 8 is a perspective view of a portion of a plunger assembly, according to an embodiment.
Figure 12:
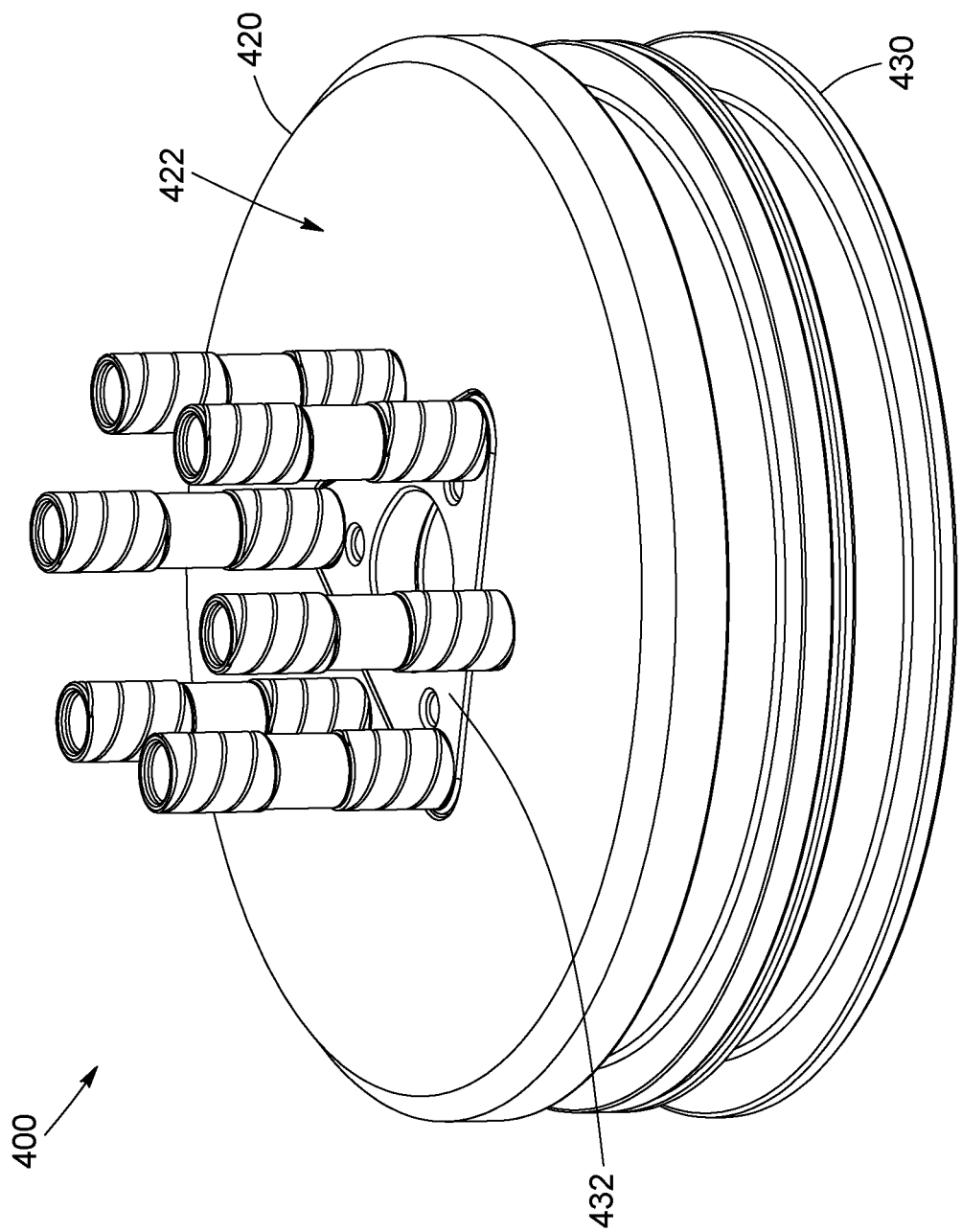
Figure 14:
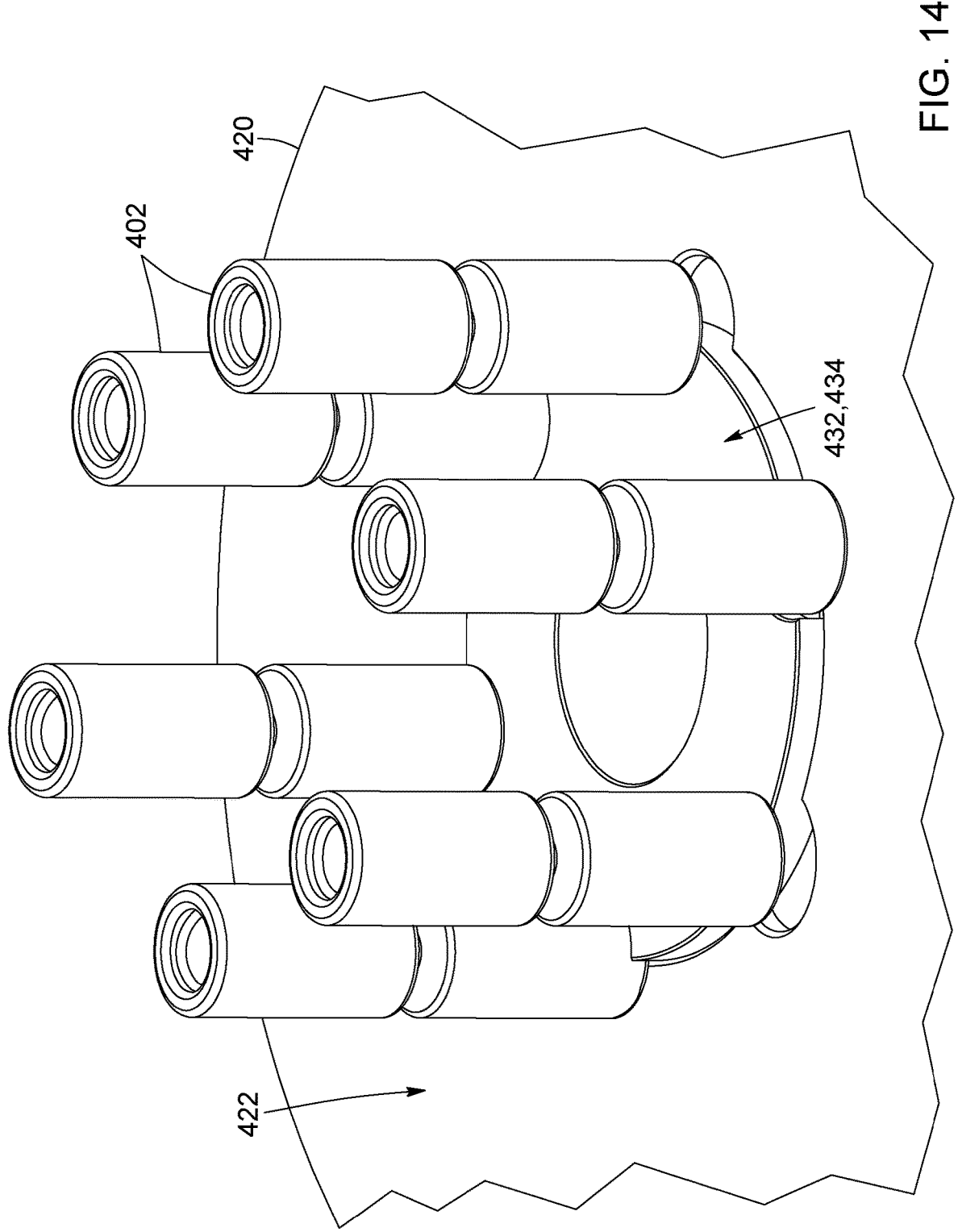
FIG. 14 is a perspective view of a plurality of plungers seated on the pistons shown in FIG. 13.
Figure 25:
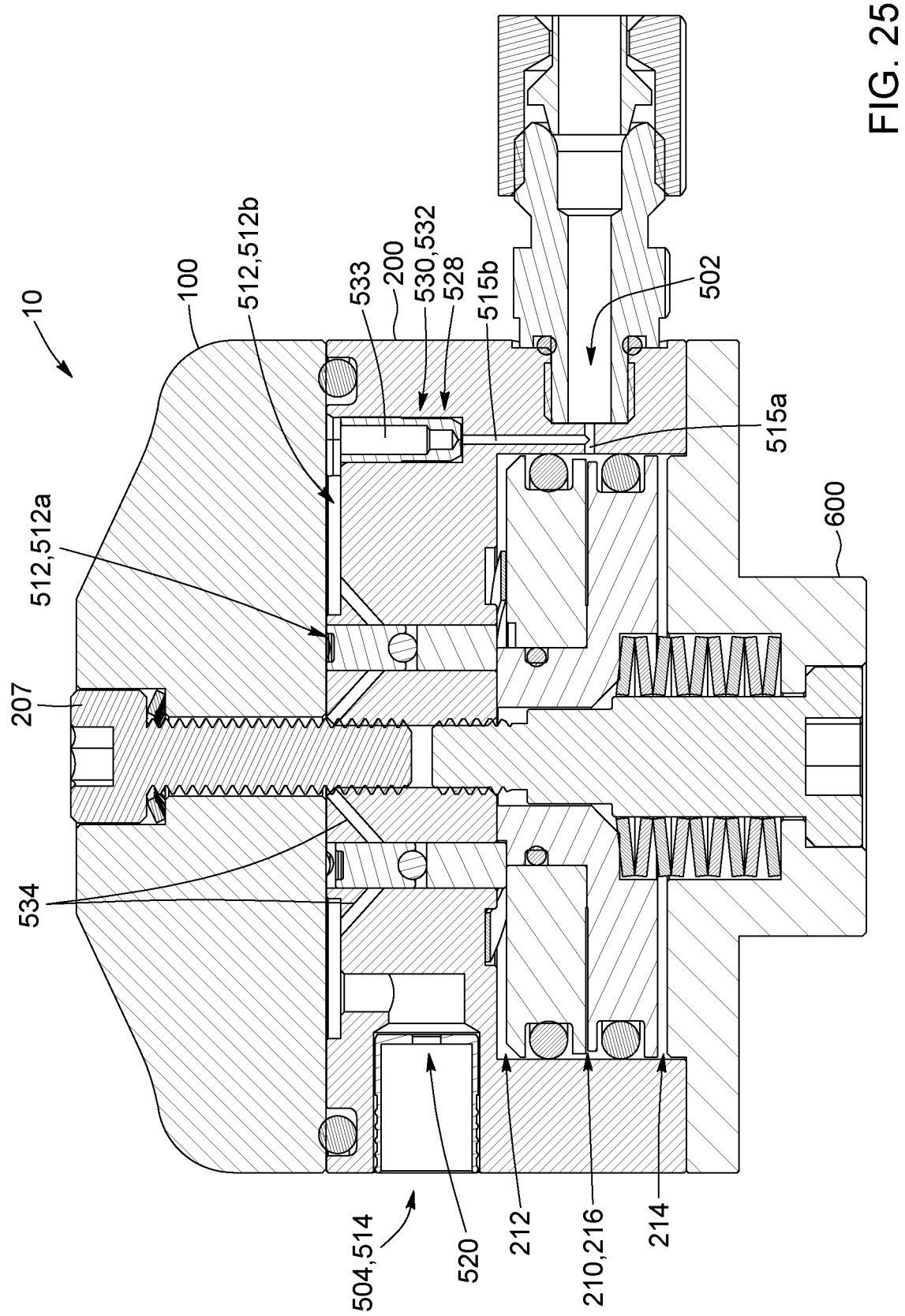

In some embodiments, the pistons (i.e., the upper piston 420 and the lower piston 430) and/or their corresponding push plate 422, 432 are preferably shaped and sized to only engage their corresponding set of plungers 402 (i.e., without contacting or impeding movement of the other set of plungers). Furthermore, the pistons 420, 430 can be configured such that the plungers 402 are either entirely seated on the corresponding piston, or partially seated thereon. In other words, the pistons can be adapted to push against the entire cross-section of the plungers 402 (as seen in FIGS. 7, 8 and 12) or against a portion thereof (as seen in FIGS. 14 and 25) where the piston contacts about half of the lower end of the plungers 402. It should be understood that pushing against the entire lower end of the plungers 402 can maintain the plungers 402 relatively straight within the plunger passages 206, thus providing a substantially even sealing force on the diaphragm 300 when the plungers are in the closed position, whereas pushing against only a portion of the lower end can cause the plunger 402 to slightly tilt within the plunger passage 206, thus providing an uneven sealing force on the diaphragm 300.

Various exemplary embodiments of the plunger assembly 400 are illustrated in the accompanying Figures and will now be described. In the embodiment seen in FIGS. 8 to 10, the upper piston 420 has a plurality of upper recesses 426 and upper protrusions 428 arranged about the central aperture 424, and the lower piston 430 has lower recesses 436 and lower protrusions 438 arranged about the piston head 434. The recesses and protrusions of each piston are preferably complementarily shaped such that when the pistons are assembled, the upper protrusions 428 sit within the lower recessed 436, and the lower protrusions 438 sit within the upper recesses 426. In the illustrated embodiment, the plungers 402 are adapted to be engaged by the protrusions of the pistons, whereby in this embodiment, the protrusions 428, 438 are shaped and configured to engage the full diameter of the plungers 402. More specifically, the upper protrusions 428 are adapted to engage the first set of plungers, and the lower protrusions 438 are adapted to engage the second set of plungers.

Referring to FIGS. 11 and 12, the piston head 434 illustratively has a circular shape, although it is appreciated that it can have any suitable shape. In the illustrated embodiment, the lower piston 430 incudes a lower push plate 432 removably connected to the piston head 434 and being complimentarily shaped with respect to the central aperture 424 of the upper piston 420. In this embodiment, the lower push plate 432 has a generally triangular shape, whereby each corner of the lower push plate 432 engages a plunger of the second set of plungers 402 (as best seen in FIG. 12). In this case, the upper push plate 422 is the top surface of the upper piston 420, and is adapted to directly engage the plungers 402 of the first set of plungers. As seen in FIG. 12, the shape and size of the lower push plate 432 allows for each set of plungers 402 to be fully seated on the corresponding push plates 422, 432.

Now referring to FIGS. 13 and 14, yet another embodiment of the plunger assembly 400 is shown. In this embodiment, the upper and lower push plates 422, 432 are provided with upper and lower recesses 426, 436 respectively. The number of recesses of each push plate can correspond to the number of plungers 402 of each set of plungers. For example, in this embodiment, each set of plungers 402 includes three plungers, such that each push plate includes three recesses. The recesses are shaped and sized to allow the pistons to be actuated (i.e., move up and down) without having the push plates contact the plungers 402 engaged by the other one of the push plates. As seen in FIG. 14, each push plate 422, 432 is configured to contact about half of the lower end of the corresponding set of plungers 402, with the other half of the plungers engaging one of the recesses 426, 436 such that contact is avoided between both pistons and their components.

While the push plates 422, 432 and corresponding plungers 402 are formed as independent/separate components in the illustrated embodiments, it is appreciated that in other embodiments, the plungers and push plates can have other configurations, and can be formed as a single component, for example. Alternatively, the plungers can be fixedly connected to the push plates, for example, using screws or other fasteners.

Now referring to FIGS. 15 to 20, in addition to FIG. 7, in some embodiments, the plungers 402 include a plunger base 406 at a lower end thereof engageable with one of the pistons. The plungers 402 further include a plunger head 408 adapted to engage the diaphragm 300 (i.e., the process groove) from below when the plungers 402 are in the closed position, and a plunger body 410 extending between the plunger base 406 and plunger head 408. The components of the plungers 402 can be made from substantially rigid material, although other materials are possible, as will be described further below.

Figure 15:
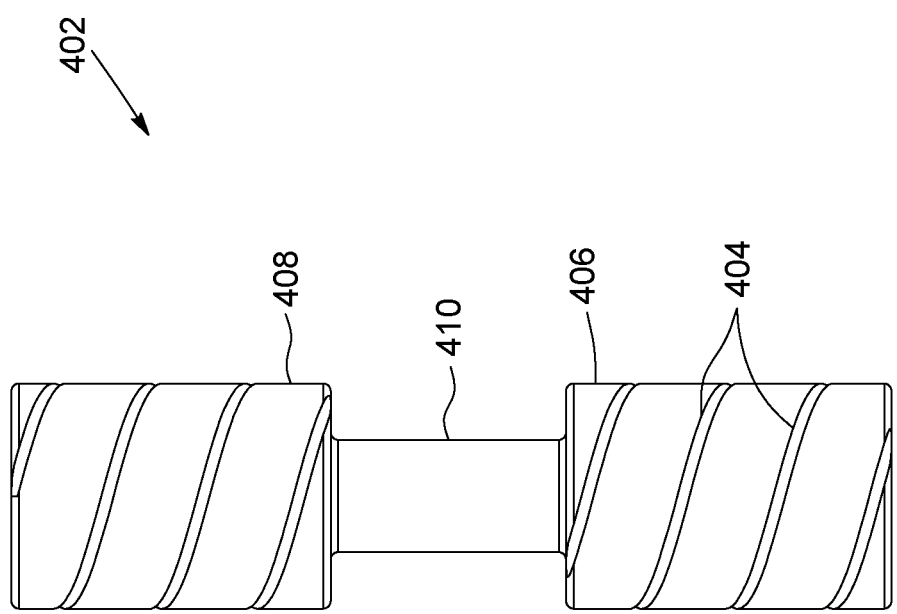
FIGS. 15 to 20 are various embodiments of a plunger.
Figure 20:
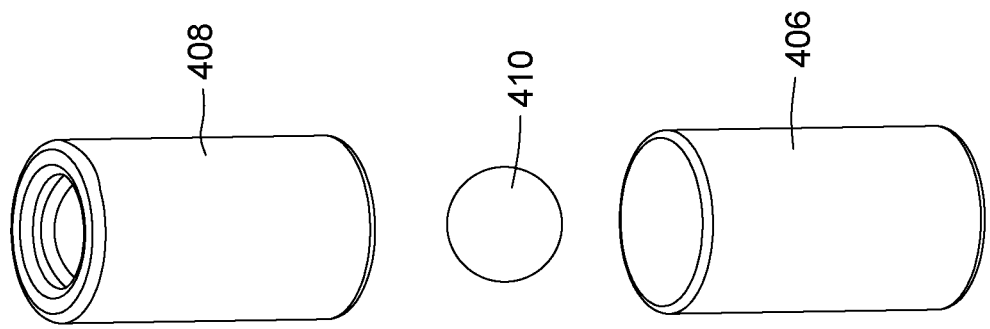

As seen in FIG. 20, the components of the plungers 402 can be independent from one another (i.e., separate components) and stacked within the plunger passages 206, although "single-unit" plungers 402, as seen in FIG. 15, can also be used. In these embodiments, the plunger base 406 and plunger head 408 have substantially the same shape, size and/or configuration. More specifically, the plunger base and head 406, 408 are generally cylindrical and have a diameter slightly smaller than the diameter of the plunger passage 206 to avoid interference/contact between the valve body 200 and the plungers 402.

It is known that manufacturing defects can occur in various components of the plunger assembly 400, such as the pistons, the push plates, the plungers, etc., which can cause a length difference or misalignment of one or more plungers 402 within their respective plunger passages 206, resulting in an uneven sealing force being applied on the diaphragm 300. As such, adjustments can be required to avoid damaging the plungers 402, the valve body 200, the diaphragm 300 and/or to ensure normal operation of the valve 10.

In some embodiments, the plunger body 410 can be shaped and configured to adjust the plunger head 408 relative to the diaphragm 300. More specifically, the plunger body 410 can be configured to position the plunger head 408 substantially transverse to the diaphragm 300 (i.e., axially aligned within its plunger passage) such that the plunger head 408 applies a generally even sealing force on the diaphragm 300. For example, the plunger body 410 can consist of a stack of Belleville washers, or of a compressible and/or elastomeric material (such as a spring or a cushion) having a compressibility adapted to adjust the alignment of the plunger head 408 when engaging the diaphragm 300. More specifically, if the plunger head 408 were to apply a higher pressure on the diaphragm than needed (due to the plungers being manufactured with uneven lengths), then the extra compressing force would be absorbed by the elastomeric material. The compressible plunger-body element can thus compensate for flaws in the geometry of the plungers or of other valve component (planarity, parallelism, etc.), diaphragm local thickness variation, etc. This configuration of the plungers allows for a force to be applied across the entire cross-sectional area of the plunger base. Here, the compressible mid-section 410 is cylindrical, but can be of any shape: hollow, conical, hourglass shaped, etc.

Figure 18:
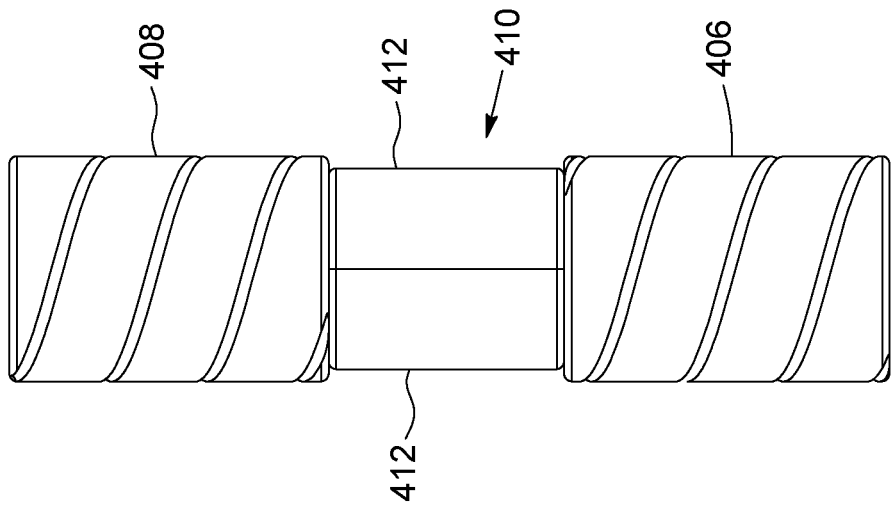
Figure 16:
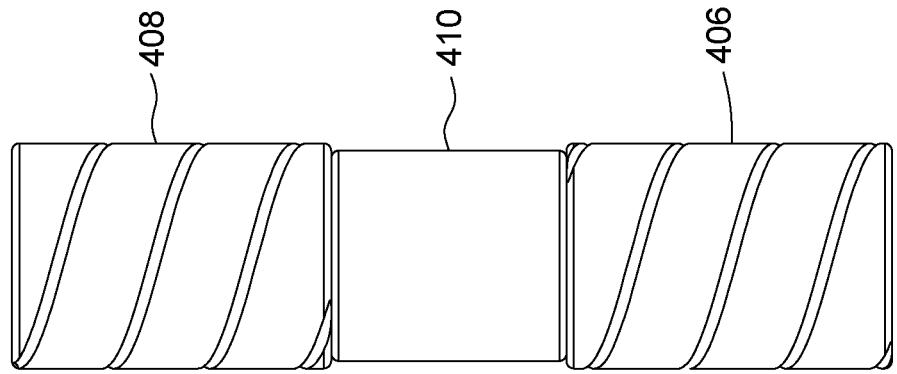

As seen in FIG. 16, the plunger body 410 can also have a generally cylindrical shape and a diameter similar to that of the plunger base and head 406, 408. In the embodiment of FIG. 18, the plunger body 410 includes at least two compressible body portions 412 extending between the plunger base and head 406, 408, whereby each body portion 412 has a respective compressibility. The compressible body portions 412 can be useful to balance an uneven force applied on the plunger base 406 by one of the pistons, such as when the piston engages only a portion (e.g., half) of the diameter of the plunger base 406, for example. In some embodiments, the piston pushes against half the plunger base 406 such that the sealing force applied on the diaphragm can be uneven across the cross-section of the plunger head 408. Therefore, the plunger body 410 having two or more compressible body portions 412 can be adapted to correct or compensate for the uneven sealing force.

Figure 17:
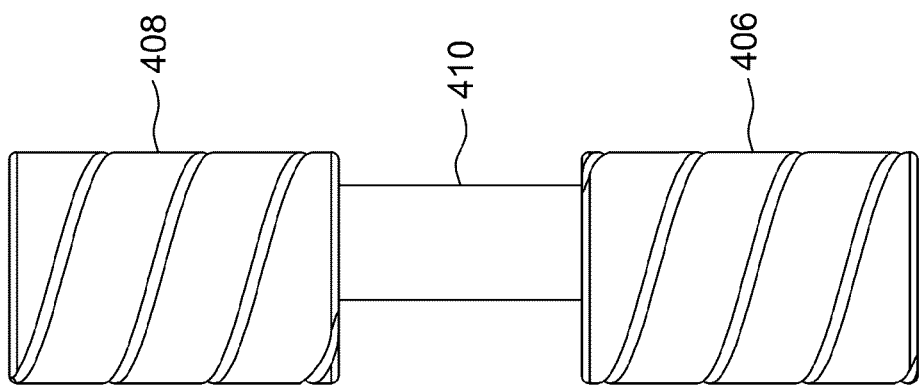

In other embodiments, such as to ones of FIGS. 15 and 17, the plunger body 410 can have a smaller diameter than the plunger base and/or head 406, 408, and can additionally be offset relative to a central longitudinal axis of the plunger 402 (FIG. 17) in order to adjust the plunger head 408 (e.g., if an uneven force is applied to the plunger base 406). It should be understood that, in order for the offset plunger body 410 to adjust the plunger head 408 in a substantially consistent manner, the radial position of the plunger 402 must remain substantially the same. In other words, rotation of the plunger 402 within the plunger passage 206 has to be blocked in order to maintain the plunger body 410 in the appropriate radial position for adjusting the forces applied by the plunger head 408 on the diaphragm 300. For example, the shape of the plunger passage 206 and plunger components can be non-circular such that rotation of the plunger 402 is blocked without hindering vertical movement of the plunger 402. It is appreciated that other suitable methods for blocking rotational movement of the plungers 402 within their respective plunger passage 206 are possible and may be used.

Figure 19:
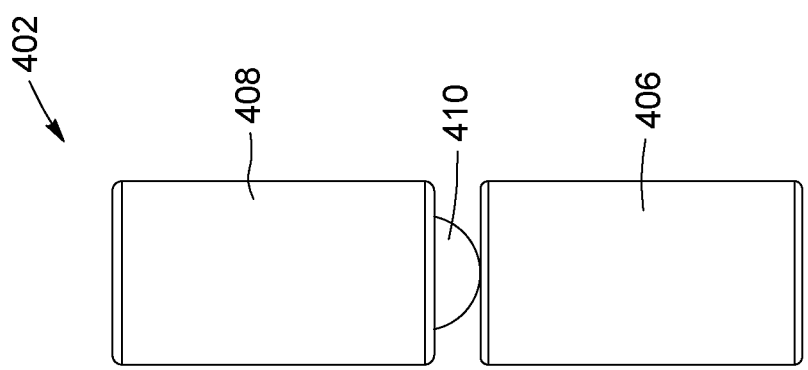

In yet another embodiment of the plunger body 410, as illustrated in FIGS. 19 and 20, the plunger body 410 can have a spherical shape such that any uneven force applied by the piston and/or plunger base 406 can be adjusted by virtue of the spherical design of the plunger body 410. It should be understood that the features of each embodiment of the plungers 402 described herein could be modified, simplified, altered, omitted and/or interchanged, depending on the particular applications the plungers are intended for, and/or the desired end results, as briefly exemplified herein and as also apparent to a person skilled in the art. In some embodiments, the spherical plunger body 410 can have a diameter substantially matching that of the plunger base and/or head 406, 408. Therefore, the compressive forces applied on the plunger 402 when in the closed position can cause the plunger body 410 to expand outwardly (due to the compressible material) and contact the walls of the plunger passage. Consequently, deformation of the plunger body 410 is reduced/limited due to the larger diameter, thus increasing its compressibility coefficient. The lifespan of the plunger body 410 can also be increased due to the reduced deformation, and therefore reduced stress on the component of the plunger 402.

Referring back to FIGS. 2 to 4, the actuating assembly 500 can include an activation system 538 configured to enable operation of the valve 10. More specifically, the activation system 538 can be operated between an engaged configuration, where actuating gas can be injected to actuate the plunger assembly 400, and a disengaged configuration, where injecting actuation gas does not actuate the plunger assembly 400. In this embodiment, the activation system 538 includes a Belleville assembly 540 including a stack of Belleville washers 542 cooperating with the lower piston 430. Additionally, the activation system 538 can include a compression screw 544 configured to apply a load/force on the stack of Belleville washers 542, thus applying a load on the lower piston 430. As such, the normally closed plungers 402 are biased towards the closed position, since the lower piston 430 is biased upwardly via the activation system 538 (e.g., when the compression screw 544 is tightened). It is appreciated that the activation system 538 may include any other biasing means, such as standard springs or polymer bushings, for enabling operation of the valve 10, such as by biasing the lower piston 430 upwardly, for example. In this embodiment, the upper piston 420 is biased downward (e.g., towards the lower piston 430) by appropriate means. In the illustrated embodiment, a wave spring 546 is provided within the valve body 200 above the upper piston 420 and is adapted to apply a downward force thereon. As such, the normally open plungers 402 are effectively biased towards the open position.

When stored for a long period, normally closed plungers of known valves are continuously pushing against the diaphragm. Over time, creeping phenomenon can change the shape of the diaphragm process groove, reducing the groove's height, consequently increasing flow restriction. By reducing or removing that pushing force, this phenomenon and negative effects can be lessened/prevented. In other words, by moving the activation system 538 in the disengaged configuration, the compression screw 544 is loosened, and the lower piston (and corresponding plungers) are allowed to move away from the diaphragm.

Figure 22:
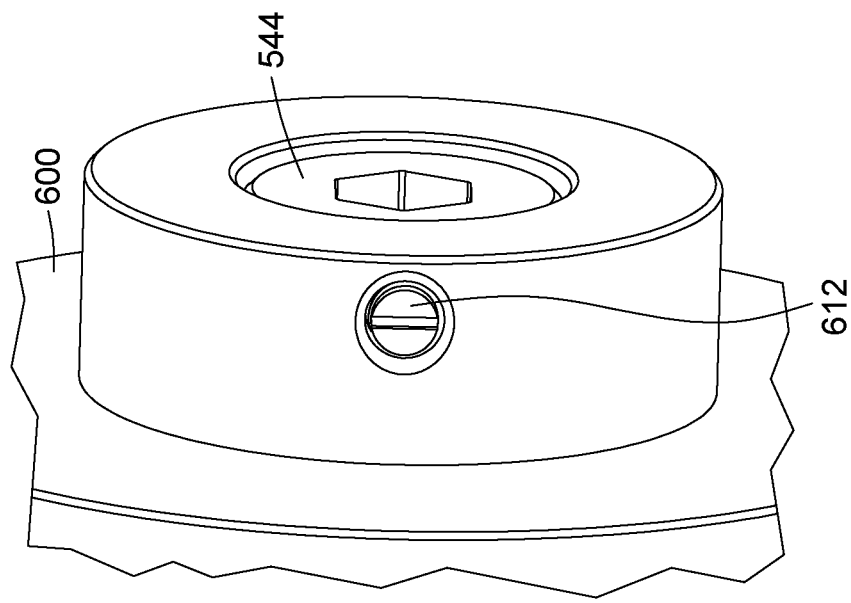
FIG. 22 is a side perspective view of the storage mechanism shown in FIG. 21, showing a set screw engaging a compression screw of the valve, according to an embodiment.
Figure 21:
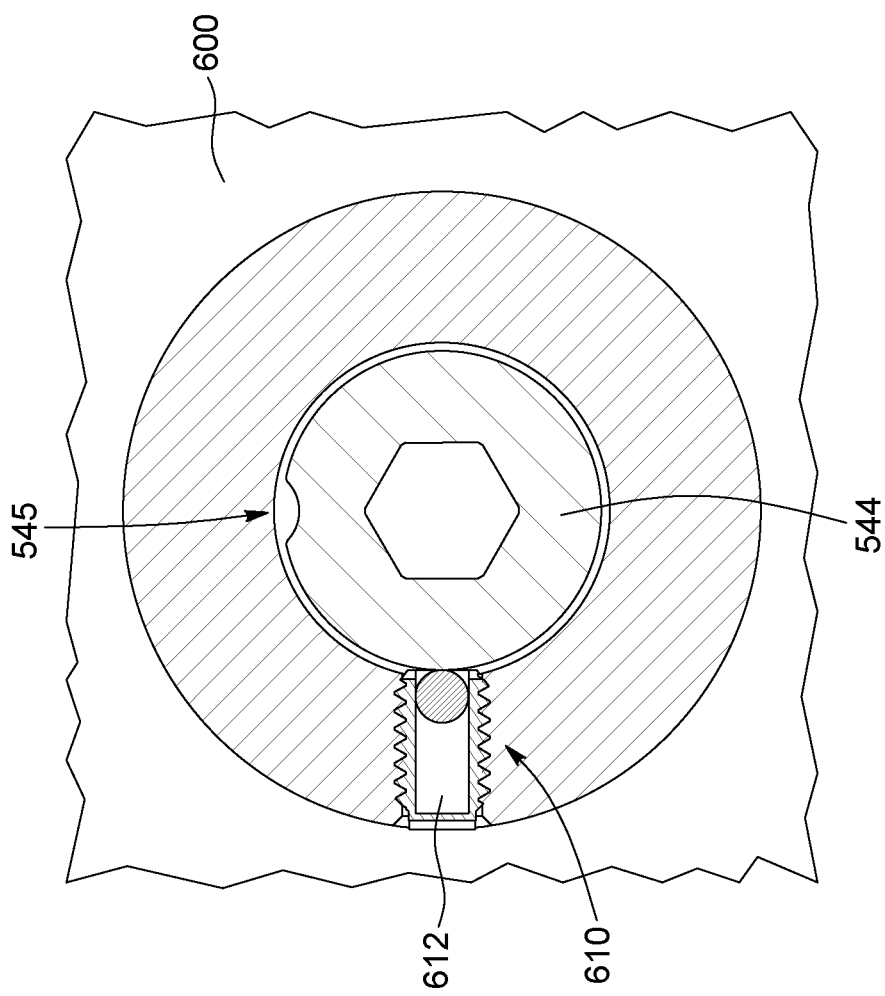
FIG. 21 is a bottom plan view of the bottom cap of the valve, showing a storage mechanism according to an embodiment.

Now referring to FIGS. 21 and 22, the valve 10 can be provided with a storage mechanism 610 operatively engaging the compression screw 544 and being configured to indicate the position of the compression screw 544. Therefore, determination of the condition of the valve 10 (e.g., in operation, in standby, in storage, etc.) can be facilitated by the configuration of the storage mechanism 610, based on the position of the compression screw 544. In this embodiment, the storage mechanism 610 includes a set screw 612 extending through the bottom cap 600 so as to engage the compression screw 544. Furthermore, the compression screw 544 can be provided with notches, or dents 545 in which the set screw 612 can extend when the compression screw is in predetermined positions. The set screw 612 can assist in positioning the compression screw 544 in desired positions and can facilitate determination of the condition of the valve 10.

It is appreciated that the described embodiment is exemplary, and that other mechanisms, devices, components and/or methods can be used for determining the condition of the valve and may be used. For example, a guiding indent, groove or mark can be used instead, to allow a user to determine whether the valve is in the "storing" configuration, or an "in-use" configuration, depending on the rotational/angular position of the compression screw 544 relative to the bottom cap 600, using the set screw 612 or other similar guide. In the example shown in FIG. 21, a spring plunger 610 is provided on the bottom cap, pushing against the preload screw. A recess 545 is formed in the preload screw 544 to get a hand-feeling when the spring plunger ball is moved across the recess. The recess 545 is positioned to allow enough preload pressure relief (usually between ¼ and ½ of a turn). When ready to use/install the valve, end user only needs to fully screw in the preload screw to get back valve operational preload.

Figure 2:
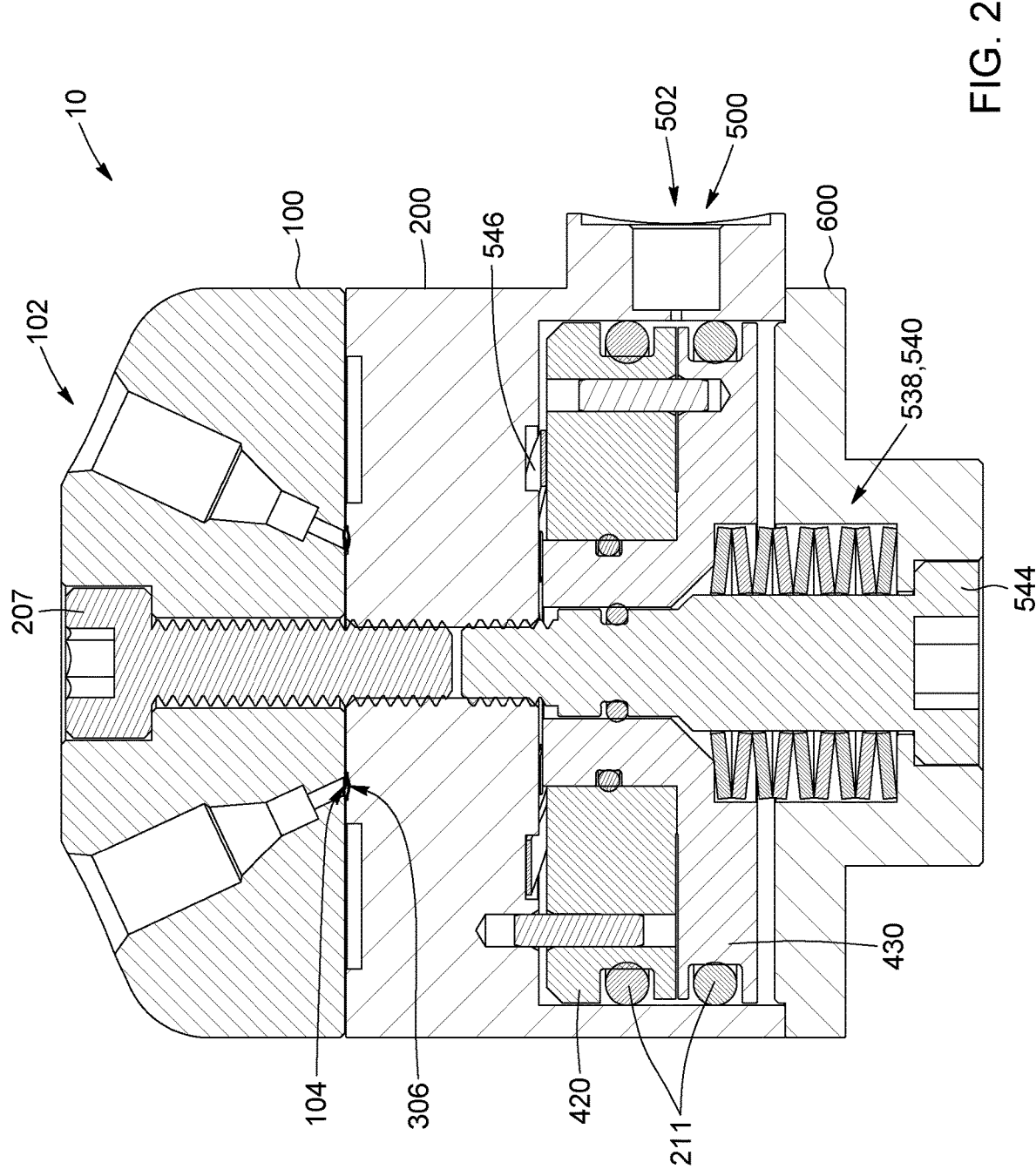
FIG. 2 is a cross-sectional view of the valve of FIG. 1, showing a pair of pistons provided within the valve, according to an embodiment.
Figure 3:
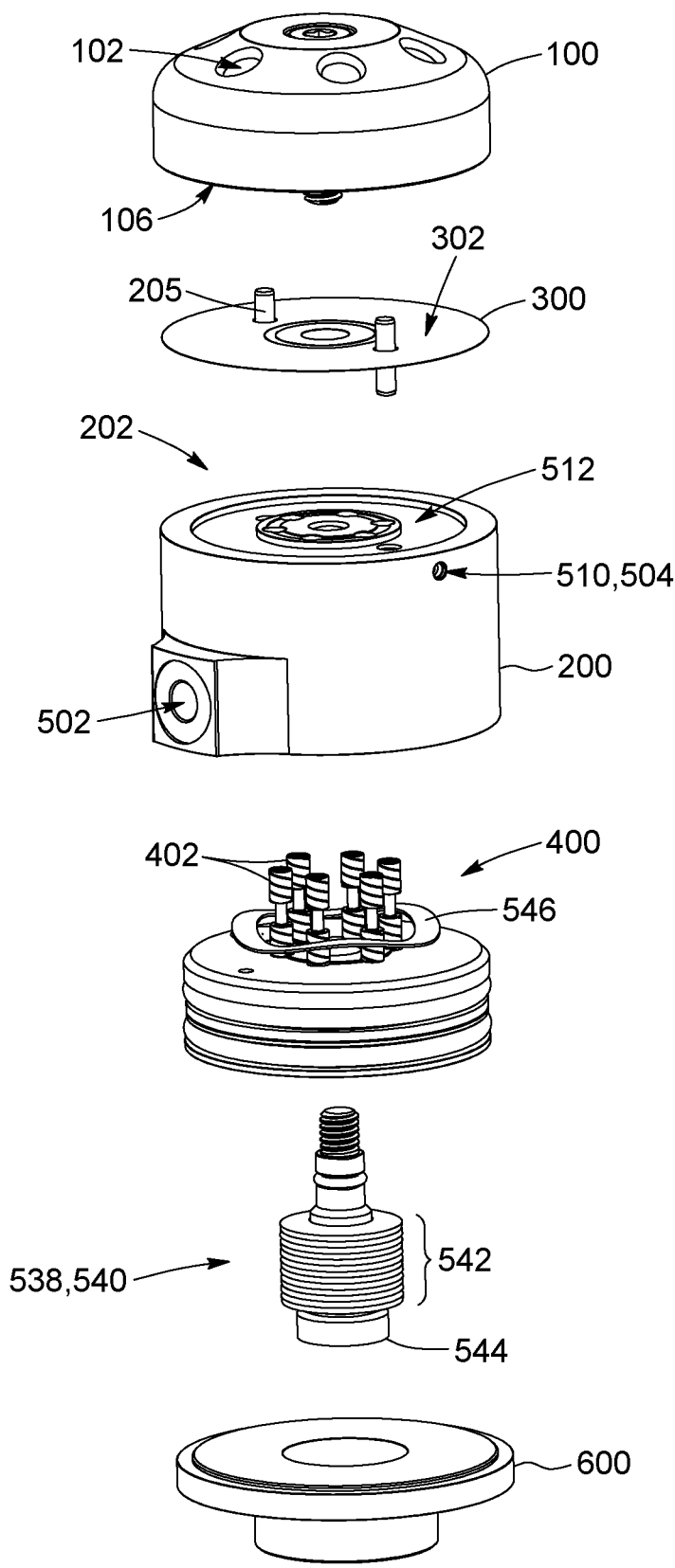
FIG. 3 is a top perspective and exploded view of the valve of FIG. 1, showing the various components of the valve, according to an embodiment.
Figure 4:
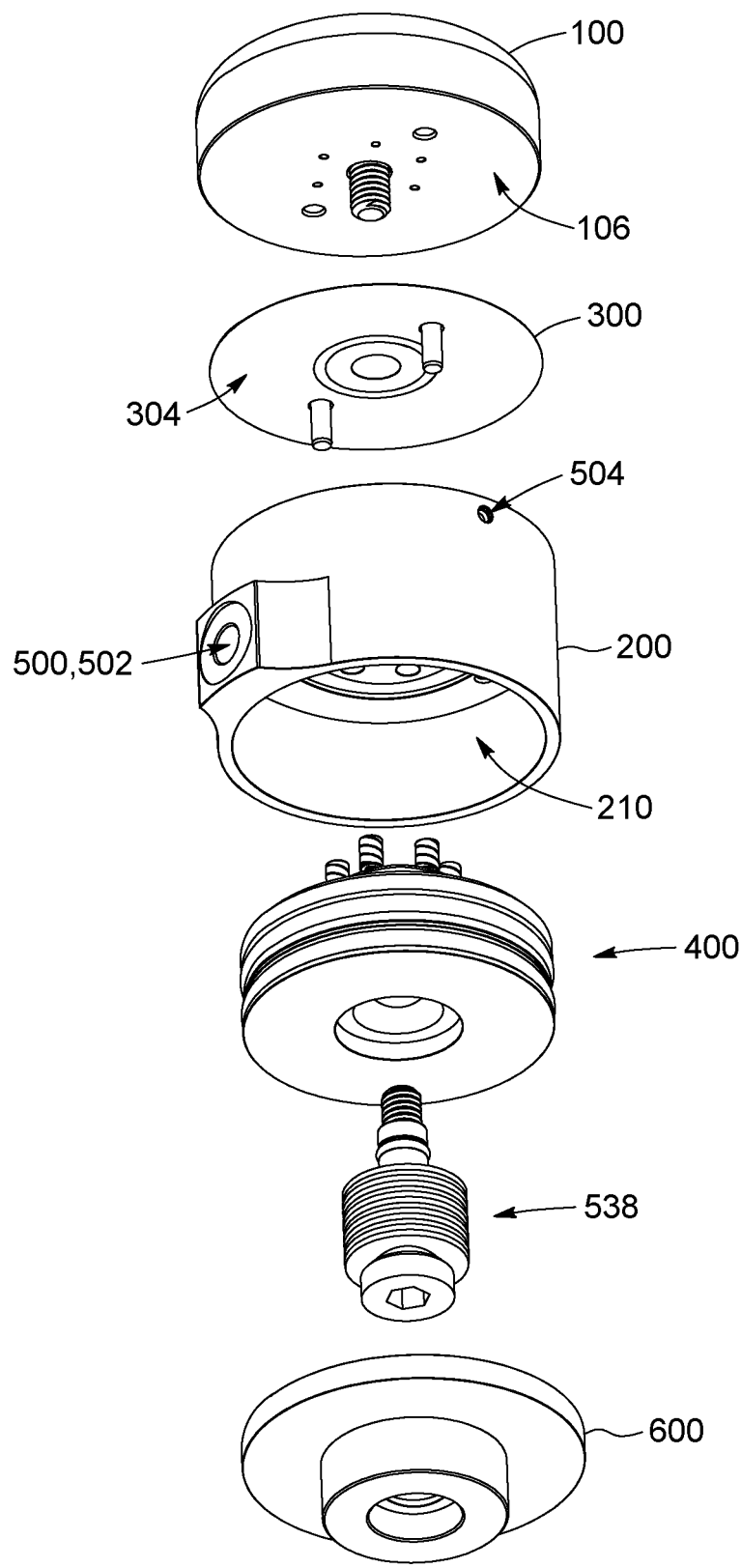
FIG. 4 is a bottom perspective and exploded view of the valve of FIG. 1, showing an internal chamber defined in the valve body, according to an embodiment.
Figure 5:
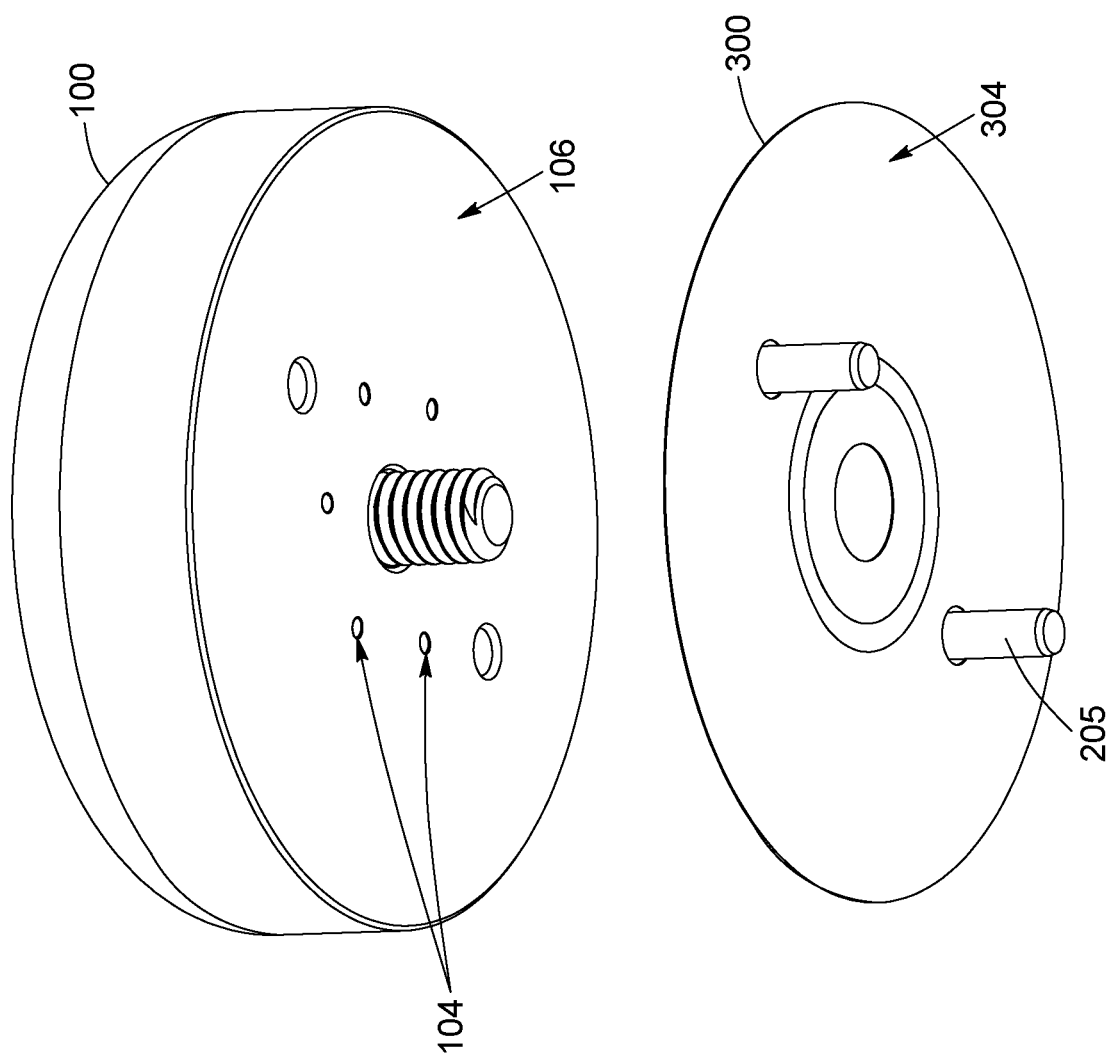
FIG. 5 is an enlarged view of a valve cap shown in FIG. 4, showing process ports opening on a surface of the valve cap, according to an embodiment.

In the illustrated embodiments, the actuating assembly 500 is operable for actuating both sets of plungers 402 between their open and closed positions. As mentioned above, the valve 10 is pneumatically actuated whereby actuating gas is injected within the valve body 200 to control the distance between the upper and lower pistons 420, 430. When not actuated, as shown in FIG. 2, the two pistons are in contact, as they are pushed towards each other by the Belleville assembly 540 and wave spring 546. The actuating mechanism 500 preferably includes a pneumatic actuator for supplying actuating gas between the upper and lower pistons 420, 430 through a gas inlet 502. When the valve is actuated, the gas will counterbalance the bias of both pistons by pushing the upper piston 420 upward, thus sliding the normally open plungers towards the closed position, and then pushing the lower piston 430 downwards, thus allowing the lower push plate and/or normally closed plungers 402 to move downward and towards the open position. It should be understood that, when actuating gas is no longer injected, the biasing effect of the Belleville assembly 540 and wave spring 546 will revert the pistons 420, 430 in their original positions (i.e., pre-actuation).

As seen in FIGS. 2 and 7, the upper and lower pistons 420, 430 are located within the internal chamber 210 formed by the valve body 200 and bottom cap 600. In this embodiment, the internal chamber 210 includes a top region 212 generally located between the upper piston 420 and the plunger passages 206, a bottom region 214 located between the lower piston 430 and the bottom cap 600, and an intermediate region 216 located between the upper and lower pistons 420, 430. As mentioned above, the actuating gas is injected between the upper and lower pistons 420, 430 (i.e., in the intermediate region 216) for actuating the pistons. The gas inlet 502 is illustratively in fluid communication with the intermediate region 216 to allow actuating gas to be injected therein. In the illustrated embodiment, the gas inlet 502 is positioned in a manner such as to be generally in line with the intermediate region 216 to facilitate injection of actuating gas, although it is appreciated that other configurations are possible, and that the gas inlet 502 can be positioned at any other suitable location. Moreover, the internal chamber 210 can be provided with sealing elements 211 configured to prevent actuating gas from escaping from the desired region(s). In this embodiment, a pair of O-rings are positioned between the pistons 420, 430 and the wall of the internal chamber 210 such that actuating gas being injected into the internal chamber 210 is forced between the pistons.

Now referring to FIGS. 6, 7 and 10, the actuating assembly 500 further includes a purging system 510 configured to effectively purge a region 512 located between the bottom surface of the diaphragm 304 and the body interface 202, referred hereinafter as the "purge region" 512. In some embodiments, and as seen in FIG. 6, the purge region 512 includes an inner purge region 512a corresponding to the region located below the diaphragm 300 along the recess 204 of the valve body 200 (i.e., below the process groove 302 of the diaphragm 300), and an outer purge region 512b corresponding to the region between the recess 204 and an inner wall of the valve body 200. In this embodiment, the purge system 510 includes an internal purging circuit 514 comprising one or more channels integrally formed in the components of the valve 10 and being adapted to route gas/fluids to the purge region 512. As will be further described below, in the illustrated embodiment, the purging circuit allows for actuating gas injected via the gas inlet 502 to flow along the channels to reach the purge region 512, and then exit the interior of the valve 10, effectively purging the purge region 512. In other words, the purging system 510 allows at least a portion of the injected actuating gas to act as a purging gas to effectively purge the region below the diaphragm 300 (i.e., the purge region 512).

In some embodiments, the channels of the purging circuit 514 can define one or more pathways for routing and/or forcing the actuating gas to the inner and/or the outer purge regions 512a, 512b. In the embodiment of FIG. 7, the purging circuit 514 includes a first controlled flow channel 516 configured for establishing fluid communication between the intermediate region 216 (i.e., where actuating gas is initially injected) and the top region 212. The controlled flow channel 516 illustratively extends through the upper piston 420 to effectively connect the intermediate and top regions 216, 212, although it is appreciated that other configurations are possible, such as providing one or more external conduits for routing gas from one region to another for example.

Figure 7A:
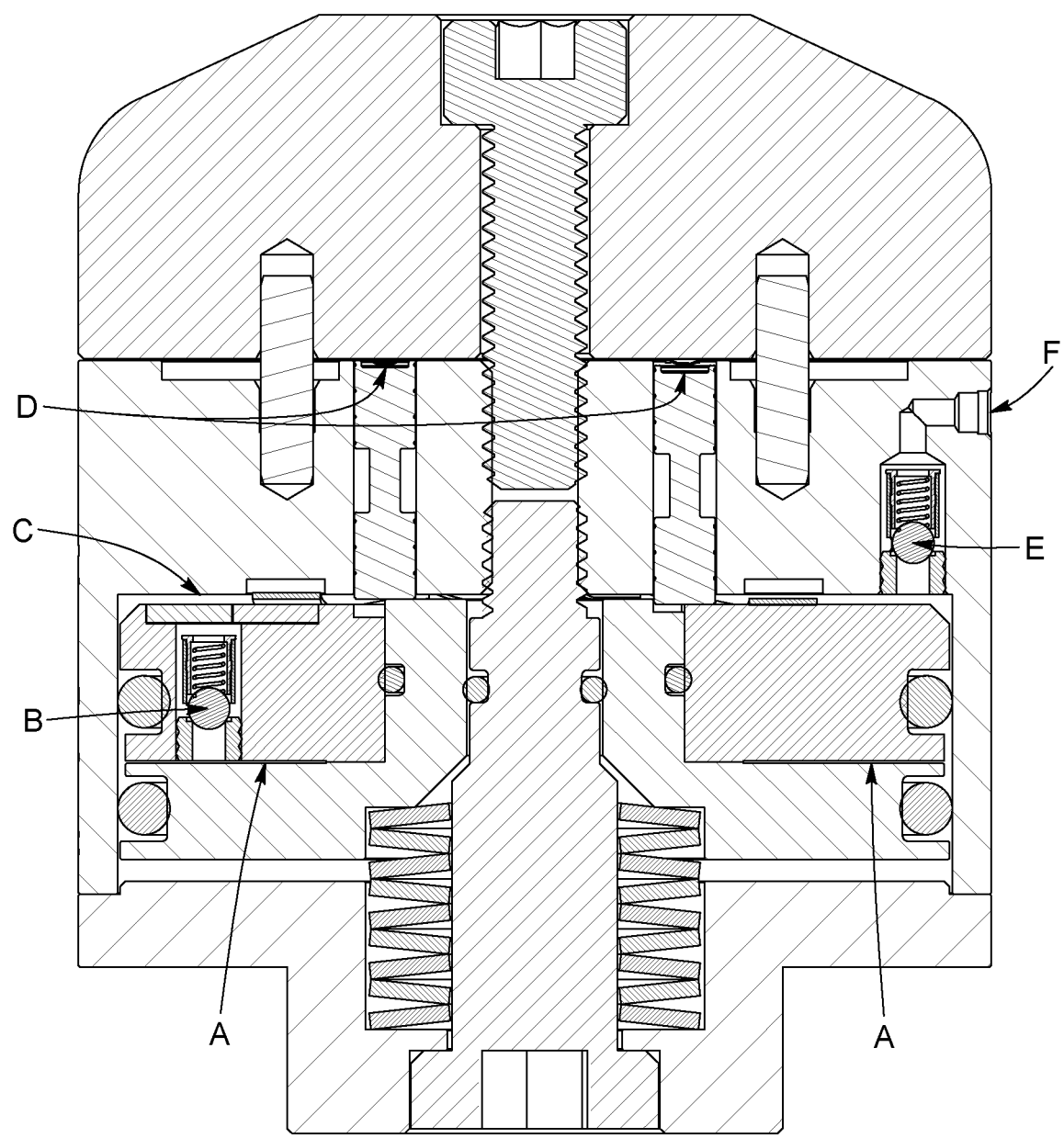

Once the actuating gas is in the top region 212, the gas can be routed to the inner purge region 512a prior to exiting the valve 10, effectively purging the region 512a. As seen in FIG. 7A, the purging circuit 514 includes a first pathway along which the actuating gas can flow to purge the inner purge region. In this embodiment, the first pathway includes: A) injecting the actuating gas into the intermediate region 216; B) actuating gas flowing through the controlled flow channel 516; C) actuating gas flowing into the top region 212; D) actuating gas flowing into the inner purge region 512a; and D) actuating gas to exiting the valve 10.

In the present embodiment, the top region 212 is in fluid communication with the purge region 512 via the plunger passages 206 extending through the valve body 200. The plunger passages 206 can be slightly larger than the plungers 402 inserted therein, thereby forming interstices through which fluid (e.g., actuating gas) can flow through to reach the purge region 512. It is appreciated that the gas flowing through the plunger passages 206 is generally limited to flowing into the inner purge region 512a since the plunger passages 206 open up on the recess 204. In some embodiments, and as seen in FIGS. 15 to 18, the plungers 402 can be provided with grooves 404 extending along an outer surface thereof to facilitate fluid communication between the top region 212 and the purge region 512. The grooves 404 can be helicoidal shaped and/or vertically oriented, although it is appreciated that other configurations are possible. For example, the plungers 402 can be provided with channels (not shown) extending through a structure of the plunger 402 (instead of around the outside surface) to allow fluid to reach the purge region 512.

Referring back to FIG. 7, the controlled flow channel 516 can be provided with a first flow restrictor 518 adapted to at least partially prevent fluid flow through the controlled flow channel 516 in order to allow actuating gas to accumulate in the intermediate region 216 for actuating the pistons 420, 430, as described above. In an exemplary embodiment, the first flow restrictor 518 includes a first check valve 519 configured to block fluid flow therethrough until a predetermined pressure in the intermediate region 216 is reached. The first check valve 519 has a first cracking pressure, which corresponds to the pressure at which the first check valve 519 opens to allow fluid flow through the controlled flow channel 516 and into the top region 212. The cracking pressure typically corresponds to the minimum upstream pressure at which the check valve will operate and can be provided in psi, psig, kPa, MPa, etc.

In the illustrated embodiment, the valve 10 includes a gas outlet 504 for allowing the actuating gas to exit the valve 10. In some embodiments, gas outlet 504 is positioned such as to establish fluid communication between the internal chamber 210 and the surrounding environment. Therefore, pressures within the valve 10 can be controlled and/or regulated by allowing some of the gas to exit the valve via the gas outlet 504. In the present embodiment, the gas outlet 504 specifically establishes fluid communication between the top region 212 of the internal chamber 210 and the surrounding environment. As such, the actuating gas located within the top region 212 can flow either towards the purge region 512 (via the plunger passages 206) and/or towards the outlet 504.

In the present embodiment, the purging system 510 includes an outlet flow restrictor 520 adapted to at least partially prevent gas from flowing through the outlet 504, therefore forcing the gas up the plunger passages 206 and into the purge region 512. The outlet flow restrictor 520 can be a check valve 521 having an outlet cracking pressure set to allow fluid flow therethrough when the pressure within the top region 212 is at or above the outlet cracking pressure. It should be understood that the pressure of the top region 212 is substantially the same as that of the inner purge region 512a such that the pressure within the inner purge region 512a is also required to reach the outlet cracking pressure before the outlet check valve 521 can open. It is also appreciated that the outlet cracking pressure is preferably higher than the first cracking pressure such that fluids (e.g., the actuating gas) can be routed to the purge region 512 prior to being expelled via the outlet 504. In some embodiments, the outlet cracking pressure is set to above the atmospheric pressure of the surrounding environment in order to maintain the top region 212 and inner purge region 512a above said atmospheric pressure during normal use of the valve 10.

In some embodiments, the flow of gas between the intermediate region 216 and the top region 212 can be controlled. For example, and as seen in FIGS. 7 and 10, the controlled flow channel 516 can include a flow limiter 522 shaped and configured to limit the flow rate of gas flowing therethrough. The flow limiter 522 can simply include a passage 524 having a reduced diameter and communicating with the outlet of the first flow restrictor 518 (e.g., the first check valve 519) to limit the flow rate of gas flowing into the top region 212 to a predetermined flow rate. The flow limiter 522 advantageously allows the valve 10 to be actuated, while decreasing the amount of actuating gas being injected through the inlet 502 for purging the purge region 512. The passage 524 of the flow limiter 522 can have any suitable shape and size, such as a straight passage, a spiraling passage, a tortuous passage, etc.

Figure 10:
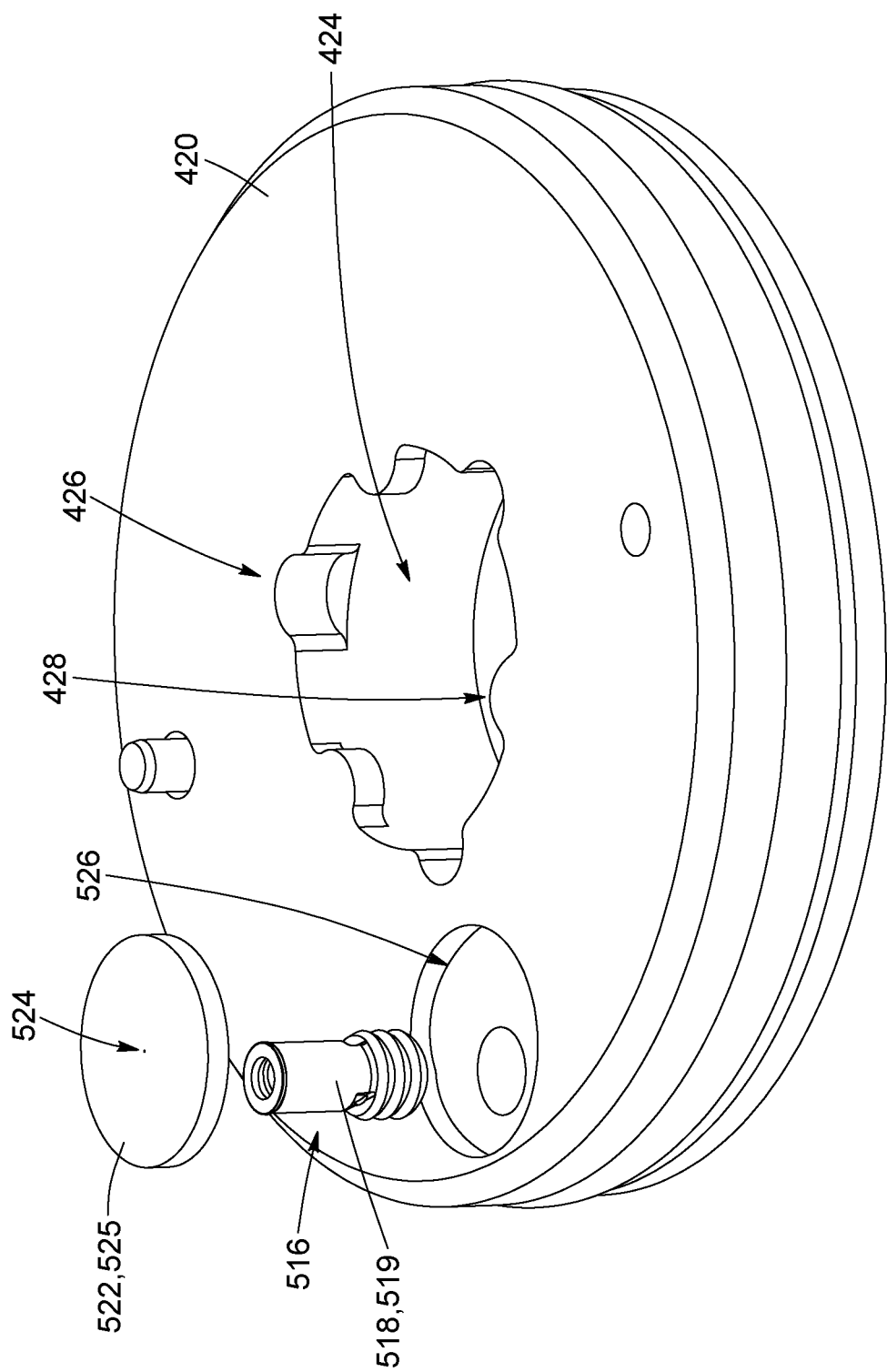
FIG. 10 is an exploded view of the upper piston shown in FIG. 9, showing a flow limiter, according to an embodiment.

In other embodiments, such as the one illustrated in FIG. 10, the flow limiter 522 can include a removable insert 525 engageable in an insert slot 526 provided in the upper piston 420 proximate the outlet of the first check valve 519. In this embodiment, the passage 524 is defined through the removable insert 525, whereby positioning the insert 525 in the insert slot 526 connects the passage 524 with the outlet of the first check valve 519 to limit the flow rate of fluids. A plurality of removable inserts 525 can be provided with different size and/or shape passages 524, thereby allowing the flow rate to be selectively adjusted based on the choice of insert 525. In some embodiments, the flow rate of fluid through the flow limiter 522 can be reduced to between about 0.5 cm$^3$/min and about 2 cm$^3$/min. Alternatively, or additionally, a single removable insert 525 can be provided with a plurality of passages 524 having different diameters, whereby changing the orientation (i.e., the radial position) in which the insert 525 is engaged in the insert slot 526 effectively changes the passage 524 connecting the check valve 519 with the top region 212.

Figure 23A:
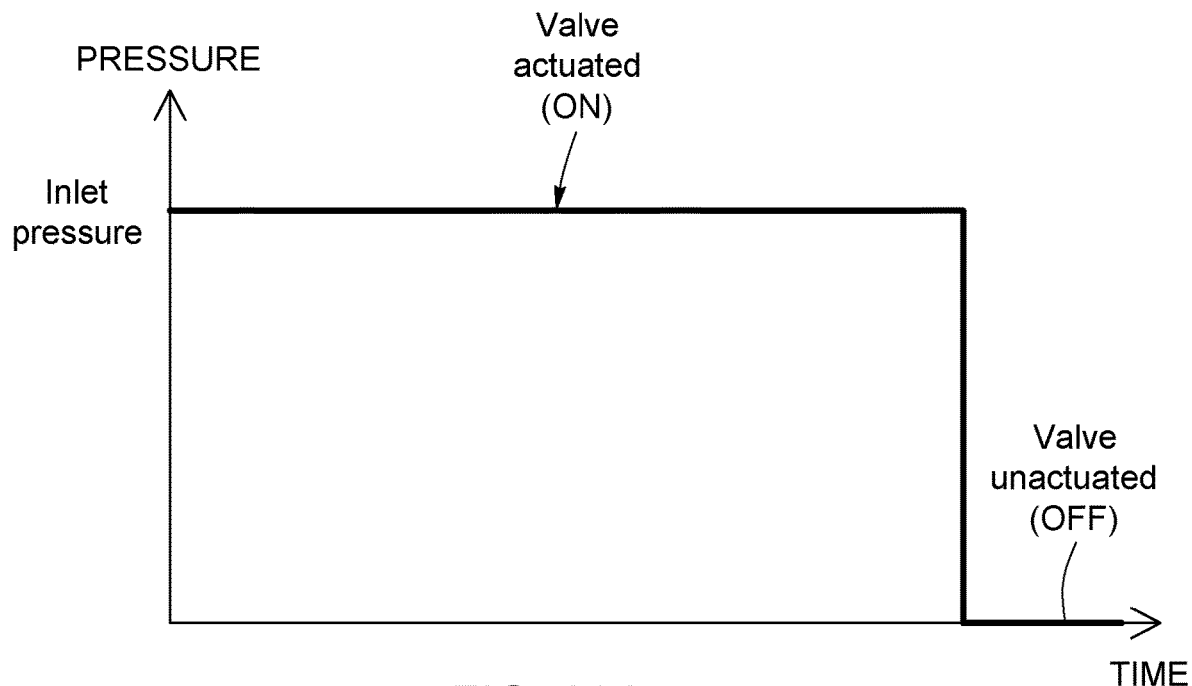
FIG. 23A is a graph illustrating the variations in pressure proximate the inlet when the valve is actuated and unactuated, according to an embodiment.
Figure 23B:
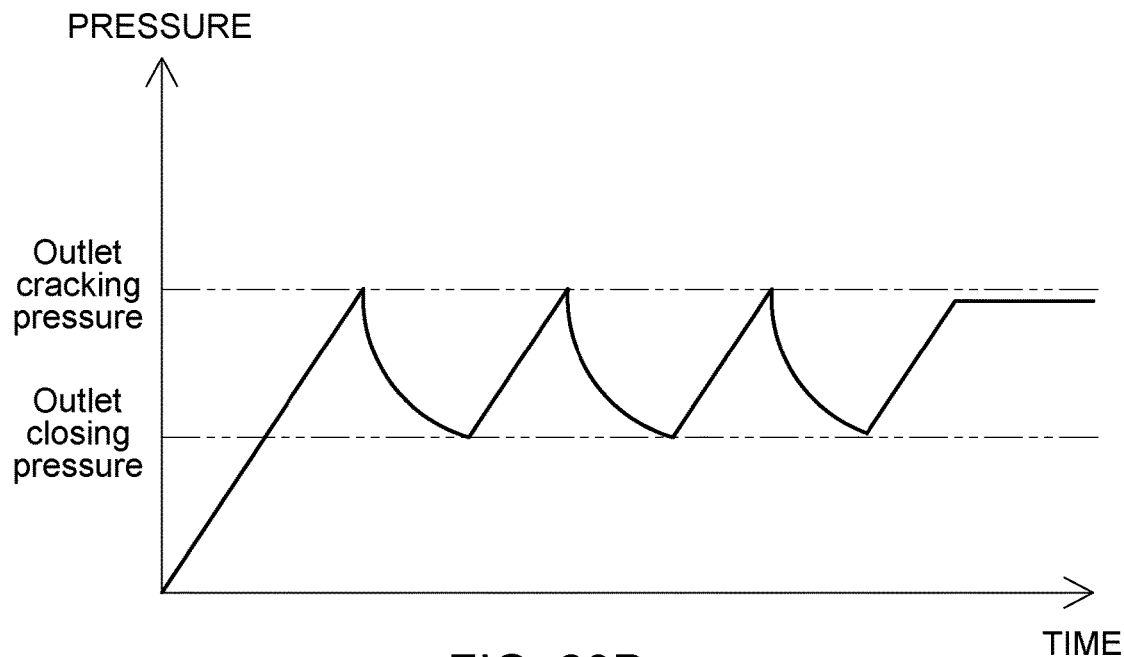
FIG. 23B is a graph illustrating the variations in pressure within a compartment or region of the valve, according to an embodiment.
Figure 23C:
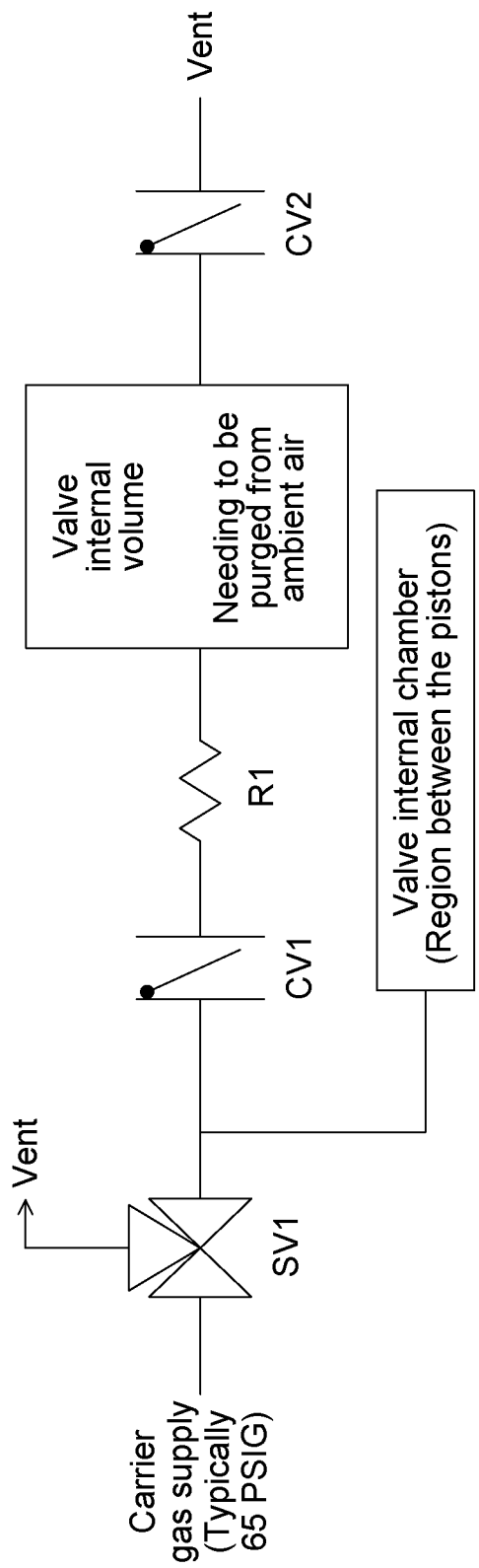
FIG. 23C is a schematic diagram illustrating the main components of the pulsing purging system.

As illustrated in FIG. 23A to 23C, and with reference to FIGS. 2 and 7, the first and/or outlet check valves 519, 521 further have respective closing pressures (i.e., a first closing pressure and an outlet closing pressure) at which the check valves close. More specifically, once the pressure within the top region 212 and inner purge region 512a reach the outlet cracking pressure, the outlet check valve 521 opens to allow gas to exit the valve via the outlet 504, effectively dragging debris and other impurities from the inner purge region 512a along with it. As gas exits the valve, the inner purge region 512a is purged and the pressure decreases. Once it reaches the outlet closing pressure, the outlet check valve 521 correspondingly closes and allows the gas to be routed to the inner purge region 512a once again. The pressure builds up within the top region 212 and inner purge region 512a until it reaches the outlet cracking pressure, and the cycle repeats.

Existing purged gas chromatography (GC) diaphragm valves generally require a continuous purge flow, supplied through a flow orifice connected to the carrier gas supply. This consumes extra carrier gas and, when using capillary column, the purge flow is of the same order than carrier flow. This type of configuration is thus inconvenient and expensive in terms of carrier gas mostly when using helium.

An objective of the purging system describe hereinabove is to set an inert zone under the diaphragm to avoid atmospheric air permeation through it. This is a real issue with unpurged diaphragm valves. Having atmospheric air permeation through the diaphragm results in carrier gas contamination that will interfere with analytical result. The purge can also reduce and potentially eliminate a build-up of hazardous impurities under the diaphragm. With the proposed valve and method, instead of relying on a dynamic purging, i.e. continuous flow, a "static" purging process is used. The proposed method relies on building a pressure within the targeted volume (i.e. purging region) using the carrier gas and letting it decrease to a value just above the atmospheric pressure, diluting the air into the targeted volume, i.e. the space under the diaphragm. After a few cycles, there is no more air under the diaphragm, as can be seen in the exemplary embodiment of FIG. 23D.

Still referring to FIGS. 23A to 23C, in addition to FIGS. 7 to 10, upon actuating the valve which controls entry of the carrier/actuating gas supply (typically a 3-way solenoid valve), the carrier gas will flow through first check valve 519 (CV1), and through flow orifice 524 (R1), limiting the actual flow into the volume, slowly pressurizing it. When the pressure in the region reaches the cracking pressure of the second check valve 533 (CV2), for example about 1 PSIG, check valve 533 (CV2) will open. Once open, the flow through the second check valve will be higher than the one coming through the orifice 524. This is achieved by selecting an orifice size much smaller than the cross-section of the second check valve (for example in the range of 0.0005 inch). Consequently, the pressure will decrease into the purging region and the second check valve will close. In some embodiments, it may be useful to provide a filter or filtration system (not shown) connected to the first check valve (CV1) for effectively filtering the gas before it reaches the orifice (R1) to prevent obstructing/blocking the orifice. It is appreciated that any other restriction(s) can be used instead of the orifice (R1), such as a restrictive filter, for example.

As shown in FIG. 23B, there is a difference between the opening and closing pressure of the first and second check-valves, creating a hysteresis of the valves. The pressure cycling will last until the actuating gas/carrier gas supply valve is shut off. At this stage, the flow is stopped within the volume/purging region, but the volume will still be pressurized to some value between the closing and cracking pressure, since the second check valve is closed, isolating the volume from atmospheric air. After a few pressure cycles, all the air is almost completely eliminated from the purging volume, by dilution effect. There is therefore actuating gas consumption only when the actuating gas inlet/solenoid valve is open. Typically, a flow target of about 1 SCCM (standard cubic centimeters per minute), driven by the actuation pressure and the orifice 524 size, is sufficient to ensure proper purging, while effectively limiting excessive gas use.

Referring to FIG. 23C, and also 2, 7 and 10, the valve SV1 is used to actuate the valve. When SV1 is actuated, the carrier/actuating gas pressurizes the volume between the pistons, moving them apart. In the upper piston plate, there is a first check valve 519 and flow orifice 524 built-in, identified as CV1 and R1 in FIG. 23C. A second check-valve 533, i.e. CV2, is fitted into the side wall of the valve as shown in FIG. 7. Alternatively, the second check valve 533 (CV2) could be installed at the end of a tube connected on the valve upper piston defined volume vent.

Still referring to FIGS. 23A and 23B, the graphics show that the pressure within the inner purge region 512a oscillates between the outlet cracking pressure and outlet closing pressure (FIG. 23B), creating a pulsing purge cycle during which the purge region is effectively purged. In some embodiments, the outlet cracking pressure can be between about 0.5 psig and about 1.5 psig such that the pressure within the purge region 512 is raised to or above the pressure of the surrounding environment, although it is appreciated that other pressures are possible. It should be understood that the unit "psig" refers to pounds per square inch gauge, which typically indicates the pressure difference between a supply tank or chamber, and the outside air. Moreover, the outlet closing pressure can be any suitable pressure which allows for a pulsated purging cycle as described herein.

The pulsing purge cycle is executed during normal use of the valve since the purging system uses the actuating gas injected through the gas inlet for performing the purge. The pressure at which the actuation gas is injected can depend on the load applied on the lower piston via the compression screw, for example, the actuating gas can be injected at a pressure of between about 50 psig and about 70 psig, although it is appreciated that any other pressures can be used depending on the particular applications which the valve is intended for, and/or the desired end results. For example, and as illustrated in FIG. 23A, actuating gas is injected via the inlet 502 to provide sufficient pressure to effectively actuate the valve 10. In this embodiment, the pressure proximate the inlet remains substantially constant while the valve 10 is actuated (i.e., turned on), and drops back down to about zero when the valve is turned off. It is noted that, once the valve is tuned off, the pressure within the purge region no longer fluctuates between the outlet cracking pressure and outlet closing pressure, as illustrated in FIG. 23B, thus isolating the volume to a pressure between the outlet cracking pressure and outlet closing pressure. The pulsing purge cycle can also reduce the amount of gas being used during normal use of the valve since the need for a continuous purge flow flowing through the valve 10 is eliminated.

In short, each time the valve is actuated, the volume defined between the diaphragm and the upper piston is cycled between the cracking and closing pressures of CV2. This cycling is repeated until SV1 is closed. At that moment, the valve is unactuated and there is no more flow through it, until the next actuation. The purge gas is allowed to reach the space under the diaphragm by flowing around the plungers.

As explained previously, the static purging cycling occurs only when the valve is actuated, and therefore carrier/actuating gas is used as purging gas supply only during actuation of the valve. No extra inlet purge port is required since the system uses the actuating gas as purging gas. Another benefit of the method is that the volume/region under the diaphragm is always over atmospheric pressure, helping to reduce atmospheric air diffusion back in the valve and substantially reduces the permeation of impurities from the sample into the purge region.

It should be noted that both check valves can be installed outside of the valve. However, extra tubing and fittings would then be needed, the compact advantage coming from the fully-integrated design would be greatly lessened. This trade-off may sometimes be needed, for example, when it is desired to recover the purge gas for recycling purposes or proper waste disposal. As such, in some embodiments, the outlet 504 can be adapted to have tubing be connected thereto for routing the gas exiting the valve to another component/apparatus (e.g., for recycling or disposal of the gas). In other embodiments, positioning the check valves outside the valve 10 can be useful when using unfiltered and/or dirty actuating gas, whereas the valve 10 can be connected to a filtration system (not shown) via the additional tubing used for connecting the check valves (or other devices) to the valve. It should also be noted that the valve 10 can be provided with any suitable number of check valves (or other similar and/or restrictive devices), either within its structure (i.e., fully integrated), outside its structure (i.e., connected with extra tubing and fittings), or a combination thereof.

Still referring to FIGS. 23A, 23B, 23C, 2, 7 and 10, but also to FIGS. 8 and 15, as the spacing/gap between a plunger and its corresponding plunger passage can be very small, it may limit flow or air exchange between actuation line and the purging region located underneath the diaphragm. This restriction can slow the purging process, limiting the effectiveness of the proposed purging system. To limit the impact of such tight tolerances between plungers and passages' sidewalls, the spiral/helicoidal grooves can be formed on the outer surface of the plungers, as best shown in FIG. 15. The grooves 404 ensure there is always a fluid exchange between the base and the head portions of the plunger, allowing the pulsing purge method to be effective.

Figure 23D:
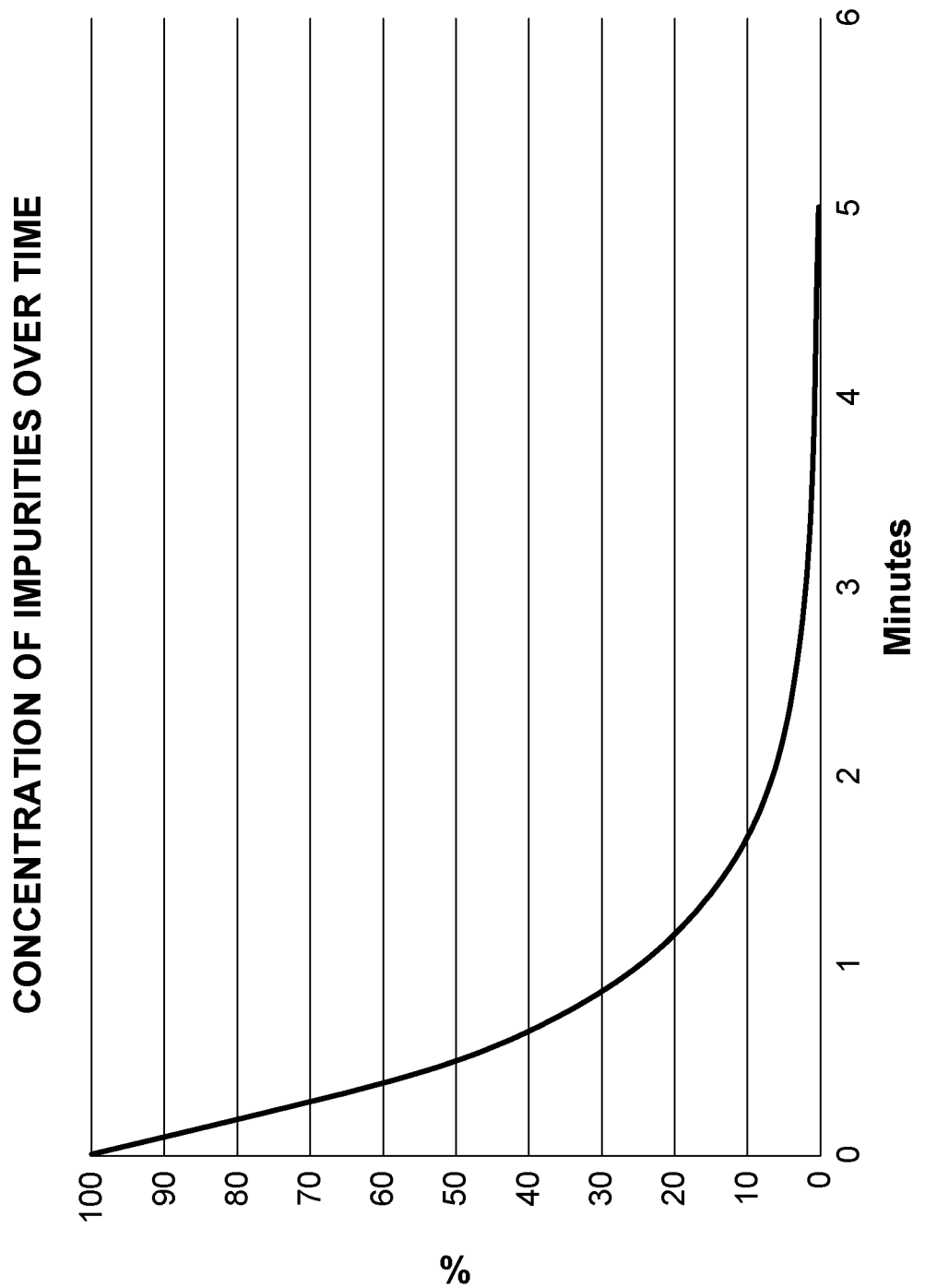
FIG. 23D is a graph illustrating the variation of the concentration of impurities within a compartment or region of the valve, according to an embodiment.

Now referring to FIG. 23D, in addition to 2, 7, 10 and 23A to 23C, the pulsing purge method can be useful in eliminating, or at least reducing the amount of impurities (e.g., debris from environment, leftover gas from previous measurements, etc.) present in certain regions or compartments of the valve 10. As seen in FIG. 23D, the concentration of impurities decreases substantially exponentially with each subsequent pulse of the pulsing purge cycle. In an exemplary embodiment, the purged volume is substantially equal to 0.5 mL, and the flow of gas through the outlet 504 is maintained at about 1 mL/min. Therefore, the purged volume is fully refreshed/purged every 30 seconds. Assuming a dilution of fluids of about 50% for each 30 seconds (i.e., the amount of air is substantially halved after each 30 seconds), then actuating the valve 10 for about 5 minutes will have refreshed the purged volume about 10 times and reduced the amount of air, and thus the concentration of impurities, to less than about 0.1% (as illustrated in FIG. 23D). It is appreciated that actuating the valve for an additional 5 minutes can reduce the amount of air in the purged volume to less than about 1 PPM, such that it can be estimated that there is no more air in the purged volume. However, it is appreciated that other configurations are possible depending on the desired results and settings of various components of the valve 10 (e.g., fluid flow through the outlet 504, volume of the purged region, etc.).

Figure 24:
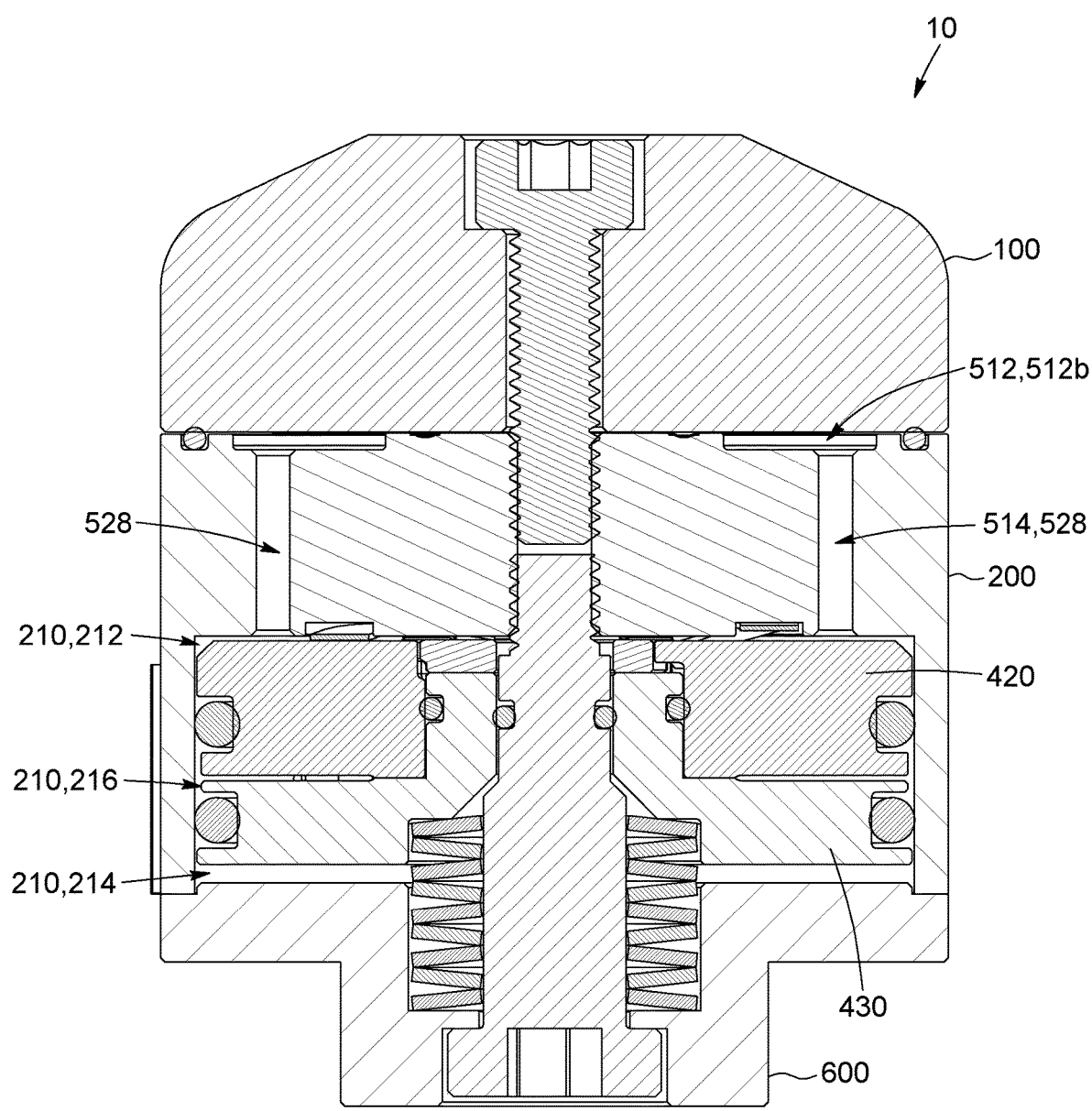
FIGS. 24 and 25 are cross-sectional views of alternative embodiments of the valve, showing a second pathway for establishing fluid communication with an outer purge region, according to possible embodiments.
Figure 26:
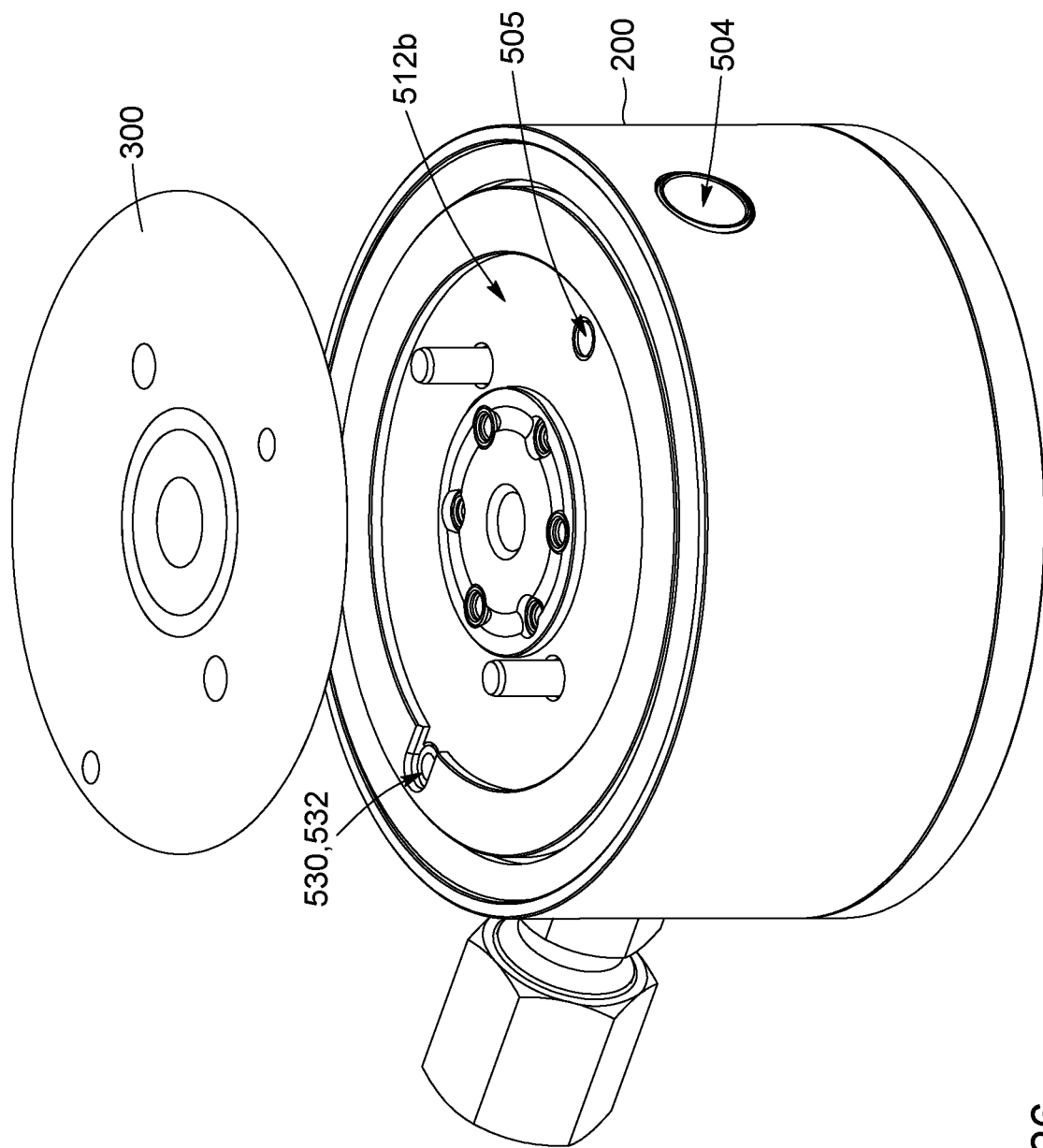
FIG. 26 is a top perspective view of the valve body shown in FIG. 25, showing the gas outlet opening up on the body interface, according to an embodiment.

Now referring to FIGS. 24 to 26, the purging circuit 514 can alternatively, or additionally, include channels defining a second pathway to allow actuating gas being injected through the inlet 502 to reach the purge region 512. For example, the second pathway can be configured to route actuating gas from the inlet 502 to the outer purge region 512b, whereas the first pathway is configured to route actuating gas to the inner purge region 512a, as described above. Therefore, the purging circuit 514 can allow actuating gas to reach the inner purge region 512a (via the first pathway) and the outer purge region 512b (via the second pathway) such that most of the region below the diaphragm 300 is purged during use of the valve 10 (e.g., on both sides of the recess 204).

As seen in FIG. 24, the purging circuit 514 can include one or more outer channels 528 extending through a portion of the valve body 200 to establish fluid communication between the top region 212 of the internal chamber 210 and the outer purge region 512b. In this embodiment, the outer channels 528 are substantially straight (e.g., vertical) and free from obstructions, although it is appreciated that other configurations are possible. For example, the outer channels 528 can have a tortuous configuration in order to reduce the flow rate of gas entering the outer purge region 512b. Furthermore, in the illustrated embodiment, the purging circuit 514 includes two outer channels 528 disposed substantially opposite one another in the valve body 200. However, it is appreciated that the purging circuit 514 can include any other suitable number of outer channels 528, such as a single outer channel, or more than two, for example.

It should thus be understood that the outer purge region 512b can be subject to generally the same pulsing purge cycle previously described. Indeed, both the inner and outer purge regions 512a, 512b are in fluid communication with the top region 212, which connects with the outlet 504. Therefore, in this embodiment, the pressure within the inner purge region 512a varies in substantially the same manner as the pressure within the outer purge region 512b, although other configurations are possible.

In other embodiments, and as illustrated in FIG. 25, the outer channels 528 can be in fluid communication with the gas inlet 502 directly, without being connected to the internal chamber 210. In this embodiment, the purging circuit 514 includes a first channel 515a extending between the gas inlet 502 and the internal chamber 210, and a second channel 515b extending from the first channel 515a at a first end thereof, and opening on the outer purge region 512b at the opposite end. Therefore, actuating gas injected via the gas inlet 502 can flow into the internal chamber 210 via the first channel 515a and toward the purge region 512 via the second channel 515b. It should be understood that the second channel 515b is one of the outer channels 528 in this case, and that the purging circuit 514 illustratively includes a single outer channel 528. However, it is appreciated that other configurations are possible.

In the illustrated embodiment, the outer channel 528 can include a second flow restrictor 532 adapted to at least partially prevent fluid flow therethrough, thus defining a second controlled flow channel 530. More particularly, the second controlled flow channel 530 can be configured to establish fluid communication between the gas inlet 502 and the outer purge region 512b. The second flow restrictor 532 can prevent fluid flow through the second controlled flow channel 530 in order to force the actuating gas along the first channel 515a and into the internal chamber 210 for actuating the pistons.

In an exemplary embodiment, the second flow restrictor 532 includes a second check valve 533 configured to block fluid flow therethrough until a predetermined pressure upstream of the second check valve 533 is reached. The second check valve 533 has a second cracking pressure which corresponds to the pressure at which the second check valve 533 opens to allow fluid flow through the second controlled flow channel 530 and into the purge region 512 (i.e., the outer purge region 512b). It should be understood that the intermediate region 216, the first channel 515a and second channel 515b are in fluid communication with one another, such that the pressure is substantially the same in each of these parts. Therefore, it should be understood that once the pressure in the intermediate region 216 reaches the second cracking pressure, the second check valve 533 effectively opens and allows fluid flow to reach the outer purge region 512b.

Furthermore, the purging circuit 514 can additionally include inner passages shaped and configured to link various portions of the purge regions 512a, 512b to one another, therefore allowing for a more even distribution of gas within these regions and/or allowing for a more efficient purging of the purge regions. For example, and as seen in FIG. 25, the purging circuit 514 can include plunger purging channels 534 positioned to establish fluid communication between the outer purge region 512b and the area of the purge region 512 proximate the central fastener 207 (e.g., between the recess of the valve body and the central fastener 207). It is appreciated that alternative, or additional, channels/passages can be provided within the structure of the valve 10 for allowing the actuating gas to flow to and from various regions and/or portions to allow for a more efficient purge cycle.

Referring to FIGS. 25 and 26, the gas outlet 504 is in fluid communication with the outer purge region 512b via an outlet opening 505 defined in the valve body 200 within the outer purge region 512b. The gas outlet 504 can be provided with the outlet flow restrictor 520, as previously described, to ensure that the pressure within the outer purge region 512b reaches the outlet cracking pressure before exiting the valve 10. The gas outlet 504 can have an orifice shaped and sized to allow a predetermined purge flow (i.e., a flow of actuating gas exiting the purge region) to exit the valve 10. For example, in some embodiments, the gas outlet 504 is shaped and sized to allow a purge flow of about 1 sccm of gas to exit the valve, although other configurations are possible. Once again, it is appreciated that, in this embodiment, the outer purge region 512b is subjected to the pulsing purge cycle, similar to the one previously described in relation with the inner purge region 512a.

As can now be appreciated, the embodiments of the valve described herein allows for purging of the region located between the diaphragm and the valve body using the actuating gas, and via a pulsing cycle. In other words, the purging system can be used to create a controlled atmosphere/environment in a region (i.e., a purged region) under the diaphragm, which is typically filled with a carrier gas. With the purge region being filled with carrier gas, it should be understood that permeation exchanges between the process flow along the diaphragm and the purge region will consist of carrier gas molecules travelling from one side of the diaphragm to the other. Therefore, when the nature of the process changes (e.g., the fluids flowing along the process flow changes), the new molecules will seek to pass through the diaphragm (via permeation). These molecules will be captured by the purging system and/or diluted in the volume of the purge region. Advantageously, if these molecules are hazardous in nature, they can then be disposed of in a controlled and safe manner.

In some embodiments, each cycle (i.e., each pulse) of the purging system can be adapted to effectively purge the same region repeatedly, or purge various regions, either according to a predetermined order, or based on necessity. Moreover, the purging circuit of the described valve is advantageously defined entirely within the valve, i.e., the purging circuit is an integral part of the valve and entirely contained therein, therefore eliminating the need for external tubing and/or specific purging gas inlet/outlets, in addition to the actuating gas inlet/outlet. It should be noted that the above-described pulsing purge cycle can be applied to other applications and be enabled using fluids other than the actuating gas of the valve 10.

The corresponding method for purging the purge region located around (e.g., underneath) the diaphragm using one of the described embodiments can include the steps of: a) injecting actuating gas into the valve via a gas inlet; b) routing the actuating gas along a purging circuit in order to reach the purge region; c) pressurizing the purge region; and d) releasing the actuation gas from within the valve via a gas outlet, effectively purging the valve. It should also be noted that the method can include connecting the purge region to a vacuum in addition to, or instead of pressurizing the purge region.

Moreover, although the embodiments of the valve and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the valve, as it is briefly explained herein and as can be easily inferred herefrom by a person skilled in the art. Moreover, it is appreciated that positional descriptions such as "top", "bottom", "above", "below", "left", "right" and the like should, unless otherwise indicated, be taken in the context of the figures and should not be considered limiting.

Furthermore, in the context of the present description, it will be considered that all elongated objects will have an implicit "longitudinal axis" or "centerline", such as the longitudinal axis of a plunger for example, or the centerline of a passage of the purging circuit, for example, and that expressions such as "connected" and "connectable", or "mounted" and "mountable", may be interchangeable, in that the present invention includes various components for assembling a resulting fully-assembled and fully-operational valve, and/or associated plunger assembly and/or actuating assembly.

Moreover, components of the present invention and/or steps of the method(s) described herein could be modified, simplified, altered, omitted and/or interchanged, without departing from the scope of the present invention, depending on the particular applications which the present invention is intended for, and the desired end results, as briefly exemplified herein and as also apparent to a person skilled in the art.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific applications or configurations. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the invention.

In the present disclosure, an embodiment is an example or implementation of the diaphragm valve. The various appearances of "one embodiment," "an embodiment" or "some embodiments" do not necessarily all refer to the same embodiments. Although various features may be described in the context of a single embodiment, the features may also be provided separately or in any suitable combination. Conversely, although the diaphragm valve may be described herein in the context of separate embodiments for clarity, it may also be implemented in a single embodiment. Reference in the specification to "some embodiments", "an embodiment", "one embodiment", or "other embodiments", means that a particular feature, structure, or characteristic described in connection with the embodiments is included in at least some embodiments, but not necessarily in all embodiments.

It should also be appreciated that similar features of the drawings have been given similar reference numerals. To preserve the clarity of the drawings, some reference numerals have been omitted when they were already identified in a preceding figure.

The invention claimed is:

1. A diaphragm valve for gas analysis applications, comprising:
  a valve cap provided with a plurality of process conduits extending therethrough, the valve cap having a cap interface, and each one of the process conduits comprising a process port opening on the cap interface;
  a valve body engageable with the valve cap and having a body interface adapted to face the cap interface and being provided with a recess, the valve body comprising a plurality of plunger passages extending therethrough, whereby the plunger passages open on the recess;
  a diaphragm positioned between the valve cap and valve body and having a process groove for circulating fluid therein, the process groove being shaped and sized to engage with the recess of the valve body;
  a plunger assembly provided within the valve body, the plunger assembly comprising a plurality of plungers slidably fitted within a corresponding one of the plunger passages, each plunger being movable between a closed position where the plunger engages the diaphragm and blocks fluid circulation along the process groove between two process ports, and an open position where the plunger is spaced from the diaphragm, thereby allowing fluid to circulate along the process groove;
  an actuating assembly comprising a gas inlet extending through the valve body to allow the injection of actuating gas for moving the plungers between the open and closed positions, the actuating assembly further comprising a purging system, comprising the gas inlet, for purging a purge region located between the diaphragm and the body interface utilizing the injected actuating gas.

2. The diaphragm valve according to claim 1, comprising a bottom cap connected to the valve body and defining therewith an internal chamber, and wherein the plunger assembly comprises an upper piston operatively engaging a first set of plungers of the plurality of plungers, and a lower piston engaging a second set of plungers of the plurality of plungers, the upper piston and the lower piston being provided within the internal chamber, whereby the internal chamber is in fluid communication with the purge region via the plunger passages.

3. The diaphragm valve according to claim 2, wherein the first set of plungers are normally-opened plungers, and the second set of plungers are normally-closed plungers.

4. The diaphragm valve according to claim 2, wherein the internal chamber comprises a top region located between the upper piston and the plurality of plunger passages, a bottom region located between the lower piston and the bottom cap, and an intermediate region located between the upper and lower pistons, and wherein the gas inlet is positioned to allow actuation gas to be injected in the intermediate region for actuating at least one of the upper and lower pistons.

5. The diaphragm valve according to claim 4, wherein the purge system comprises a controlled flow channel adapted to establish fluid communication between the intermediate region and the top region, the controlled flow channel comprising a first flow restrictor configured to restrict fluid flow therethrough in order to build pressure in the intermediate region.

6. The diaphragm valve according to claim 5, wherein the first flow restrictor comprises a first check valve having a first cracking pressure and being configured to allow fluid flow therethrough when the pressure within the intermediate region is above the first cracking pressure.

7. The diaphragm valve according to claim 6, wherein the controlled flow channel further comprises a flow limiter having a passage in fluid communication with an outlet of the first check valve, the passage being shaped and sized to limit a flow rate of the actuating gas from the intermediate region to the top region.

8. The diaphragm valve according to-claim 7, wherein the actuation assembly further comprises a gas outlet positioned to establish fluid communication between the internal chamber and the surrounding environment, wherein the gas outlet comprises an outlet flow restrictor adapted to at least partially prevent gas from exiting the internal chamber, thereby routing the actuating gas to the purge region via the plunger passages.

9. The diaphragm valve according to claim 8, wherein the gas outlet communicates with the top region, and wherein the outlet flow restrictor comprises an outlet check valve having an outlet cracking pressure configured to allow fluid flow therethrough when the pressure within the top region is above the outlet cracking pressure, and wherein the outlet check valve has a closing pressure at which the outlet valve closes, and wherein the pressure within the purge region oscillates between the outlet cracking pressure and the closing pressure.

10. The diaphragm valve according to claim 4, wherein the plungers have an outer surface, and wherein each plunger comprises one or more grooves extending along respective outer surfaces between a top end and a bottom end thereof to facilitate fluid communication between the top region of the internal chamber and the purge region.

11. The diaphragm valve according to claim 2, wherein the plungers include a plunger head adapted to engage the diaphragm, a plunger base adapted to be engaged by one of the upper and lower pistons, and a plunger body extending between the plunger head to the plunger base, wherein the plunger head, plunger base and plunger body of one or more plungers are independent from one another and are stacked within respective plunger passages.

12. The diaphragm valve according to claim 11, wherein the plunger head and plunger base are substantially rigid, and wherein the plunger body is made of a compressible material, an elastomeric material or a combination thereof.

13. The diaphragm valve according to claim 11, wherein the plunger body comprises at least two adjacent portions extending between the plunger head and plunger base, and wherein each portion has a different compressibility.

14. The diaphragm valve according to claim 11, wherein the plunger body is offset from a central longitudinal axis of the plunger.

15. The diaphragm valve according to claim 11, wherein the plunger base of each plunger is entirely seated on the corresponding one of the upper and lower pistons.

16. The diaphragm valve according to claim 11, wherein the plunger base of each plunger is fixedly connected to the corresponding one of the upper and lower pistons.

17. The diaphragm valve according to claim 2, wherein the bottom cap comprises a storage mechanism operatively engaged with the actuation screw to indicate the position of the actuation screw, and wherein the actuation screw comprises notches distributed about an outer periphery of the head of the actuation screw, and wherein the storage mechanism comprises a set screw engageable with the notches of the actuation screw.

18. A method of purging a purge region of a diaphragm valve, the method comprising:
   injecting actuating gas into the diaphragm valve via a gas inlet, the diaphragm valve comprising:
      a valve cap provided with a plurality of process conduits extending therethrough, the valve cap having a cap interface, and each one of the process conduits comprising a process port opening on the cap interface;
      a valve body engageable with the valve cap and having a body interface adapted to face the cap interface and being provided with a recess, the valve body comprising a plurality of plunger passages extending therethrough, whereby the plunger passages open on the recess;
      a diaphragm positioned between the valve cap and valve body and having a process groove for circulating fluid therein, the process groove being shaped and sized to engage with the recess of the valve body;
      a plunger assembly provided within the valve body, the plunger assembly comprising a plurality of plungers slidably fitted within a corresponding one of the plunger passages, each plunger being movable between a closed position where the plunger engages the diaphragm and blocks fluid circulation along the process groove between two process ports, and an open position where the plunger is spaced from the diaphragm, thereby allowing fluid to circulate along the process groove; and
      an actuating assembly comprising the gas inlet extending through the valve body to allow injection of the actuating gas for moving the plungers between the open and closed positions, the actuating assembly further comprising a purging system, comprising the gas inlet, for purging the purge region located between the diaphragm and the body interface utilizing the injected actuating gas;
   routing the actuating gas along a purging circuit to reach the purging region;
   pressurizing the purging region; and
   releasing the actuation gas via a gas outlet to purge the purging region.

19. The method of claim 18, wherein the purging circuit is defined entirely within the diaphragm valve.

20. A diaphragm valve for gas analysis applications, comprising:
   a valve cap provided with a plurality of process conduits extending therethrough, the valve cap having a cap interface, and each one of the process conduits comprising a process port opening on the cap interface;
   a valve body engageable with the valve cap and having a body interface adapted to face the cap interface and being provided with a recess, the valve body comprising a plurality of plunger passages extending therethrough, whereby the plunger passages open on the recess;
   a diaphragm positioned between the valve cap and valve body and having a process groove for circulating fluid therein, the process groove being shaped and sized to engage with the recess of the valve body;
   a plunger assembly adapted to be installed within the valve body, the plunger assembly comprising a plurality of plungers slidably fitted within a corresponding one of the plunger passages, each plunger being adapted to selectively engage the diaphragm to control fluid circulation along the process groove;
   an actuating assembly comprising an activation system comprising an actuation screw operably connectable to the plunger assembly and being operable between an engaged position, where the diaphragm valve can be operated for gas analysis applications, and a disengaged position; and
   a storage mechanism comprising a set screw engageable with a first portion of the actuation screw for indicating that the actuation screw is in the engaged position, and a second portion of the actuation screw for indicating that the actuation screw is in the disengaged position.

* * * * *